(12) United States Patent
Jang

(10) Patent No.: US 11,089,309 B2
(45) Date of Patent: Aug. 10, 2021

(54) METHOD FOR PROCESSING IMAGE ON BASIS OF INTER-PREDICTION MODE AND DEVICE THEREFOR

(71) Applicant: LG ELECTRONICS INC., Seoul (KR)

(72) Inventor: Hyeongmoon Jang, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/943,908

(22) Filed: Jul. 30, 2020

(65) Prior Publication Data

US 2021/0006798 A1 Jan. 7, 2021

Related U.S. Application Data

(63) Continuation of application No. PCT/KR2019/007837, filed on Jun. 27, 2019.

(30) Foreign Application Priority Data

Jun. 27, 2018 (KR) .................. 10-2018-0074069

(51) Int. Cl.
*H04N 19/137* (2014.01)
*H04N 19/176* (2014.01)
(Continued)

(52) U.S. Cl.
CPC ......... *H04N 19/159* (2014.11); *H04N 19/105* (2014.11); *H04N 19/137* (2014.11); *H04N 19/176* (2014.11); *H04N 19/52* (2014.11)

(58) Field of Classification Search
CPC ..................... H04N 19/159; H04N 19/105
See application file for complete search history.

(56) References Cited

U.S. PATENT DOCUMENTS 10,368,083 B2 * 7/2019 Chien ................. H04N 19/70
10,382,738 B2 * 8/2019 Kim ..................... G06F 3/011
(Continued)

FOREIGN PATENT DOCUMENTS

| JP | 2017-163584 A | 9/2017 |
|---|---|---|
| KR | 10-2015-0105264 A | 9/2015 |
| KR | 10-2018-0038371 A | 4/2018 |

OTHER PUBLICATIONS

X. Xiu et al., "Description of SDR, HDR, and 360° video coding technology proposal by InterDigital Communications and Dolby Laboratories", Joint Video Experts Team (JVET) of ITU-T SG 16 WP 3 and ISO/IEC JTC 1/SC 29/WG 11, Apr. 10-20, 2018, JVET-J0015-v1, XP030261692.
(Continued)

*Primary Examiner* — Irfan Habib
(74) *Attorney, Agent, or Firm* — Dentons US LLP

(57) ABSTRACT

Disclosed herein are a method for decoding a video signal and a device therefor. Specifically, a method for decoding an image based on an inter prediction mode may include: if a merge mode is applied to a current block, generating a merge candidate list by using a spatial neighboring block and a temporal neighboring block of the current block; obtaining a merge index indicating a candidate to be used for an inter prediction of the current block in the merge candidate list; deriving a motion vector of each of subblocks included in the current block based on a motion vector of the candidate used for the inter prediction of the current block; and generating a prediction sample of the current block by using the motion vector of each of subblocks.

9 Claims, 25 Drawing Sheets

(51) Int. Cl.
*H04N 19/159* (2014.01)
*H04N 19/105* (2014.01)
*H04N 19/52* (2014.01)

(56) References Cited

U.S. PATENT DOCUMENTS

| | | | |
|---|---|---|---|
| 10,469,869 B1* | 11/2019 | Li | H04N 19/573 |
| 10,674,175 B2* | 6/2020 | Park | H04N 19/70 |
| 10,820,007 B2* | 10/2020 | Park | H04N 19/50 |
| 10,841,576 B2* | 11/2020 | Lee | H04N 19/132 |
| 2015/0281708 A1 | 10/2015 | Chuang et al. | |
| 2016/0295240 A1* | 10/2016 | Kim | H04N 19/176 |
| 2016/0330475 A1* | 11/2016 | Zhou | H04N 19/583 |
| 2016/0344903 A1* | 11/2016 | Zhou | H04N 19/52 |
| 2016/0381382 A1 | 12/2016 | Oh et al. | |
| 2017/0019680 A1* | 1/2017 | Lee | H04N 19/52 |
| 2017/0188028 A1 | 6/2017 | Park et al. | |
| 2018/0192053 A1* | 7/2018 | Zhou | H04N 19/52 |
| 2020/0045307 A1* | 2/2020 | Jang | H04N 19/70 |
| 2020/0053380 A1* | 2/2020 | Chen | H04N 19/107 |
| 2020/0221077 A1* | 7/2020 | Park | H04N 19/513 |
| 2020/0228796 A1* | 7/2020 | Seregin | H04N 19/70 |
| 2020/0275110 A1* | 8/2020 | Galpin | H04N 19/33 |
| 2020/0280735 A1* | 9/2020 | Lim | H04N 19/523 |

OTHER PUBLICATIONS

J. Chen et al., "Coding tools investigation for next generation video coding based on HEVC" Proceedings of SPIE, IEEE, US, vol. 9599, Sep. 22, 2015, pp. 95991B-1-95991B-9, XP060060836.

* cited by examiner

[Fig. 1]
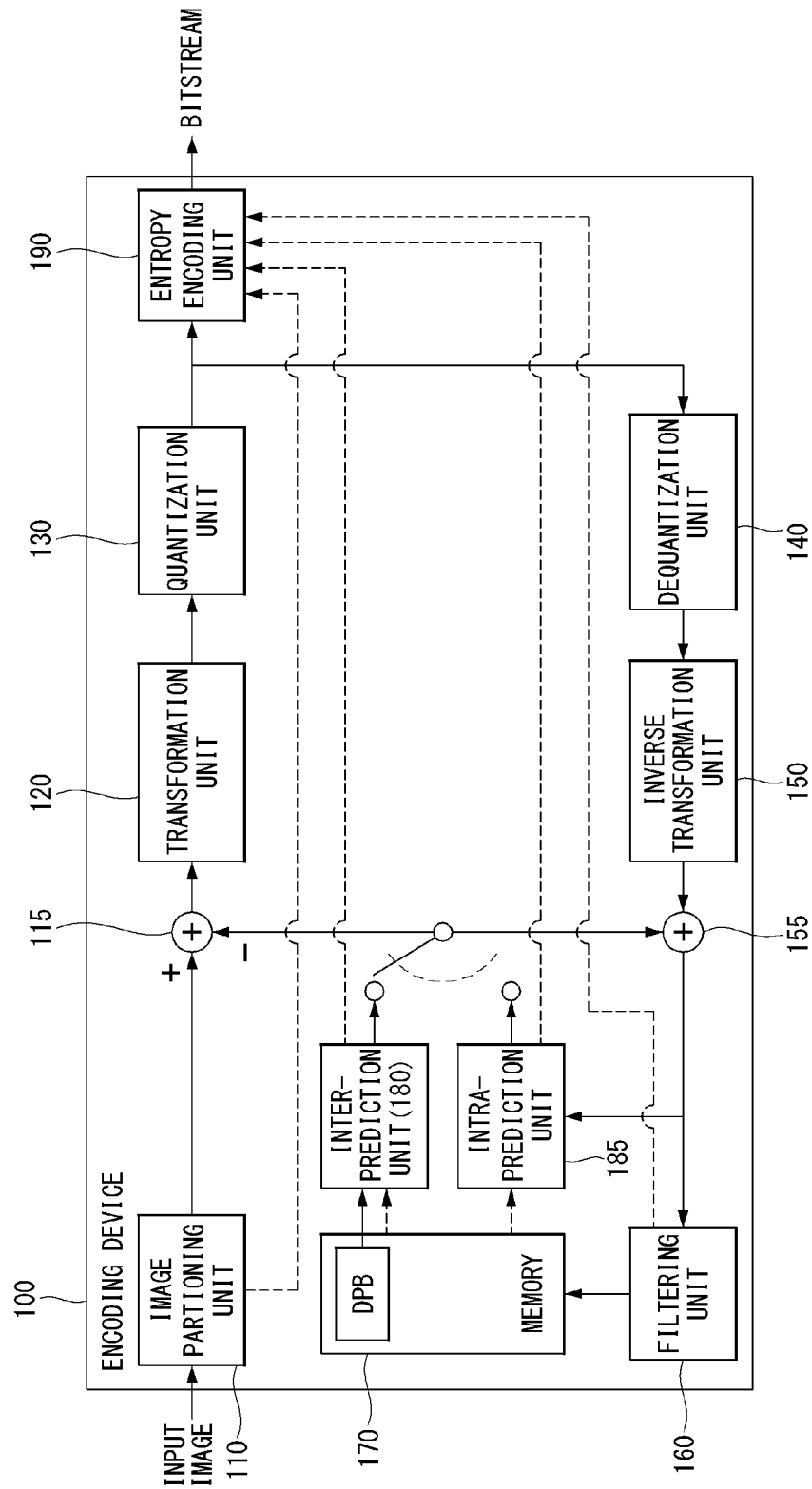

[Fig. 2]
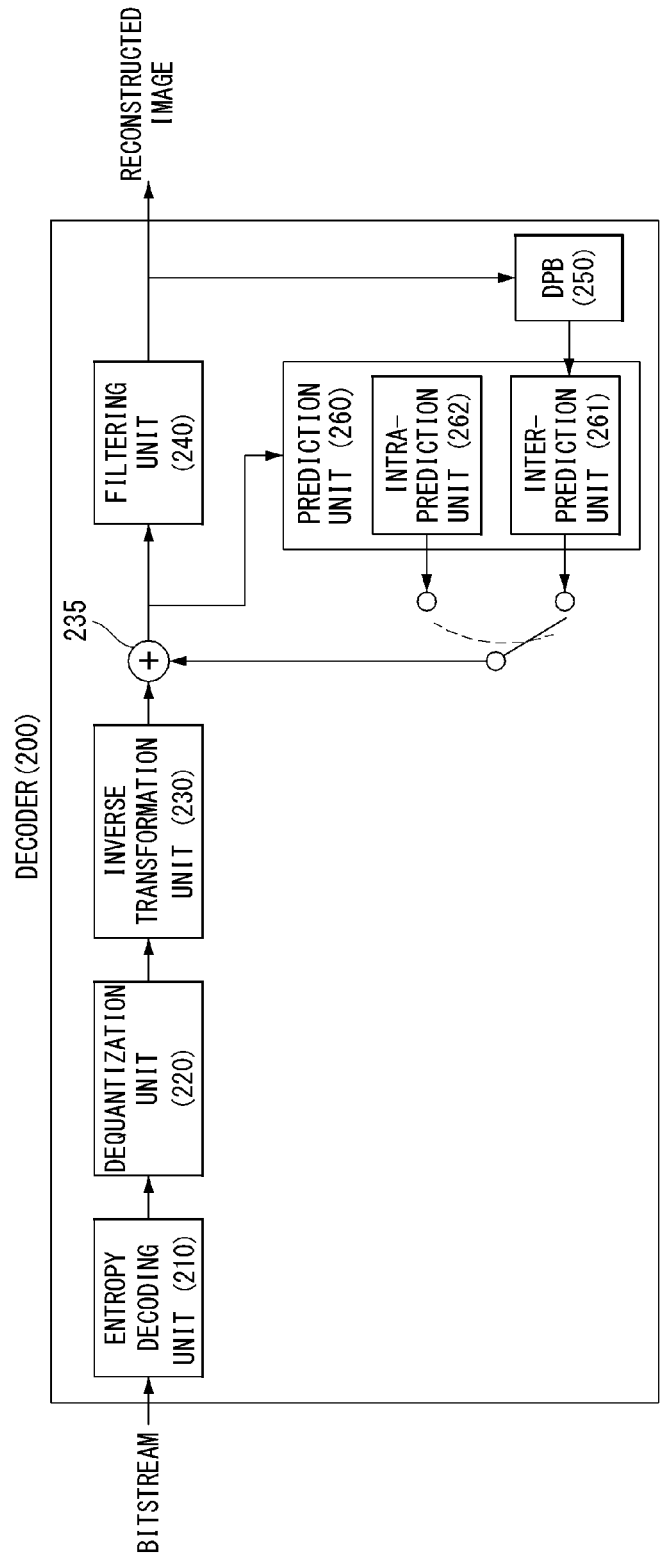

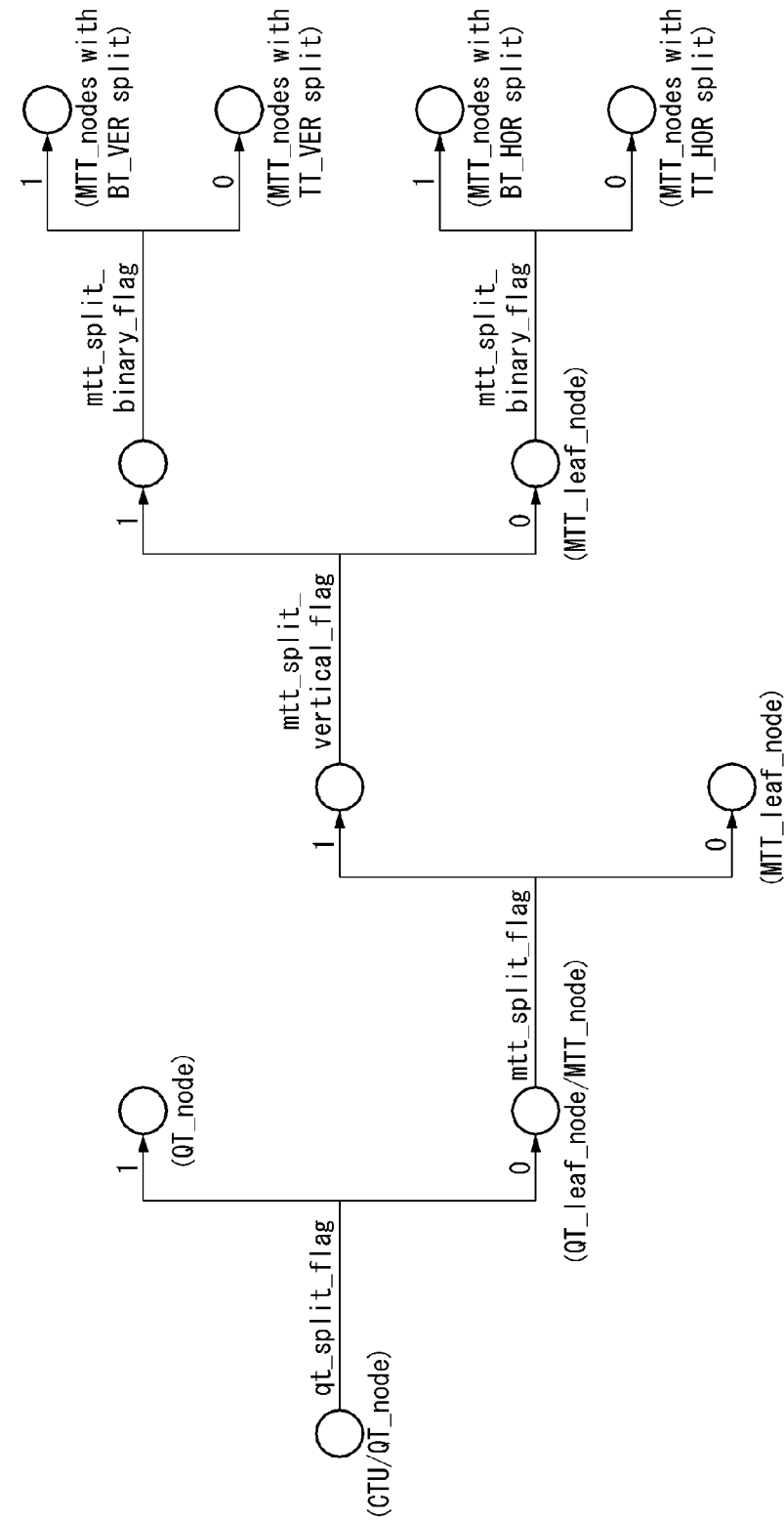
[Fig. 4]

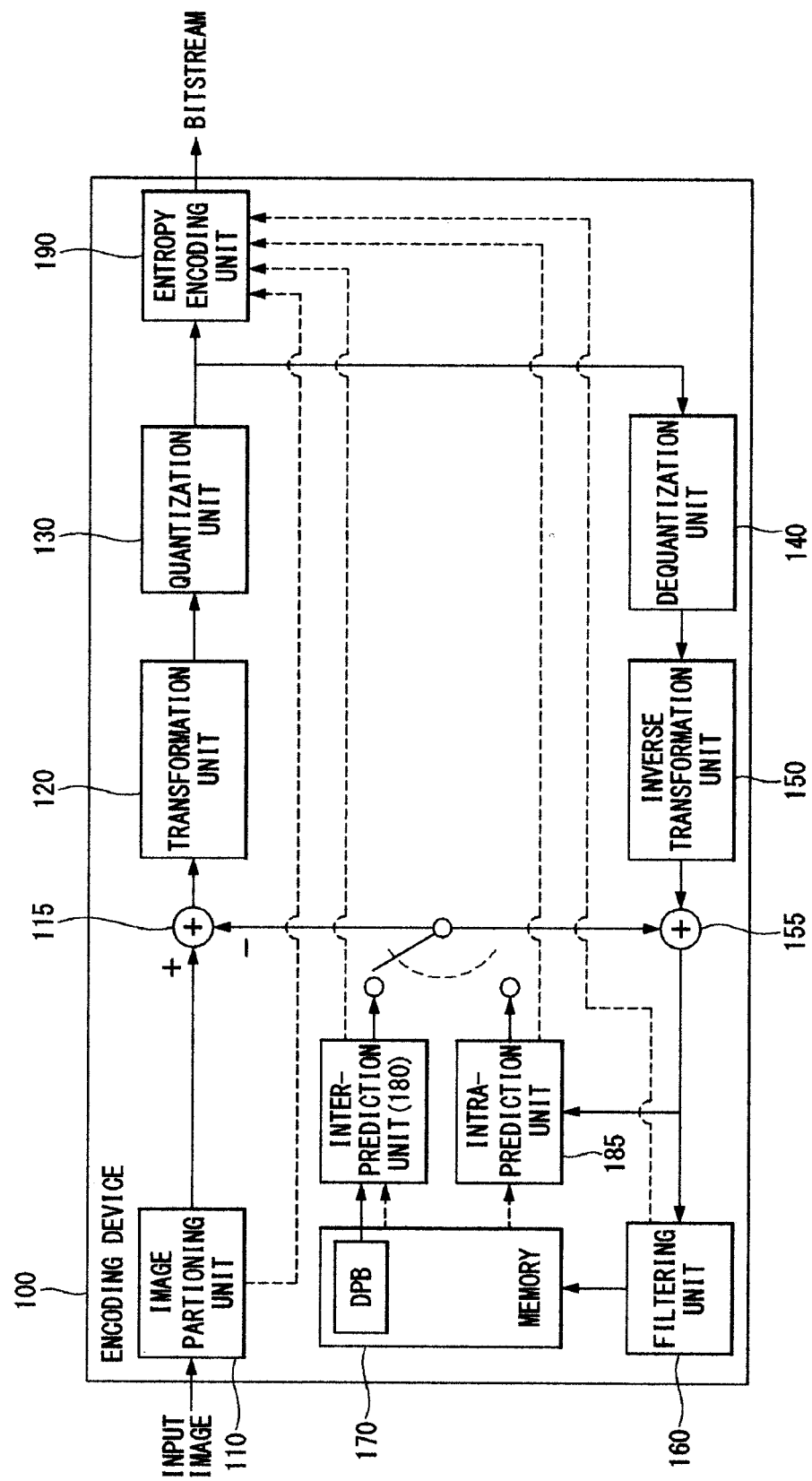
[Fig. 1]

[Fig. 2]
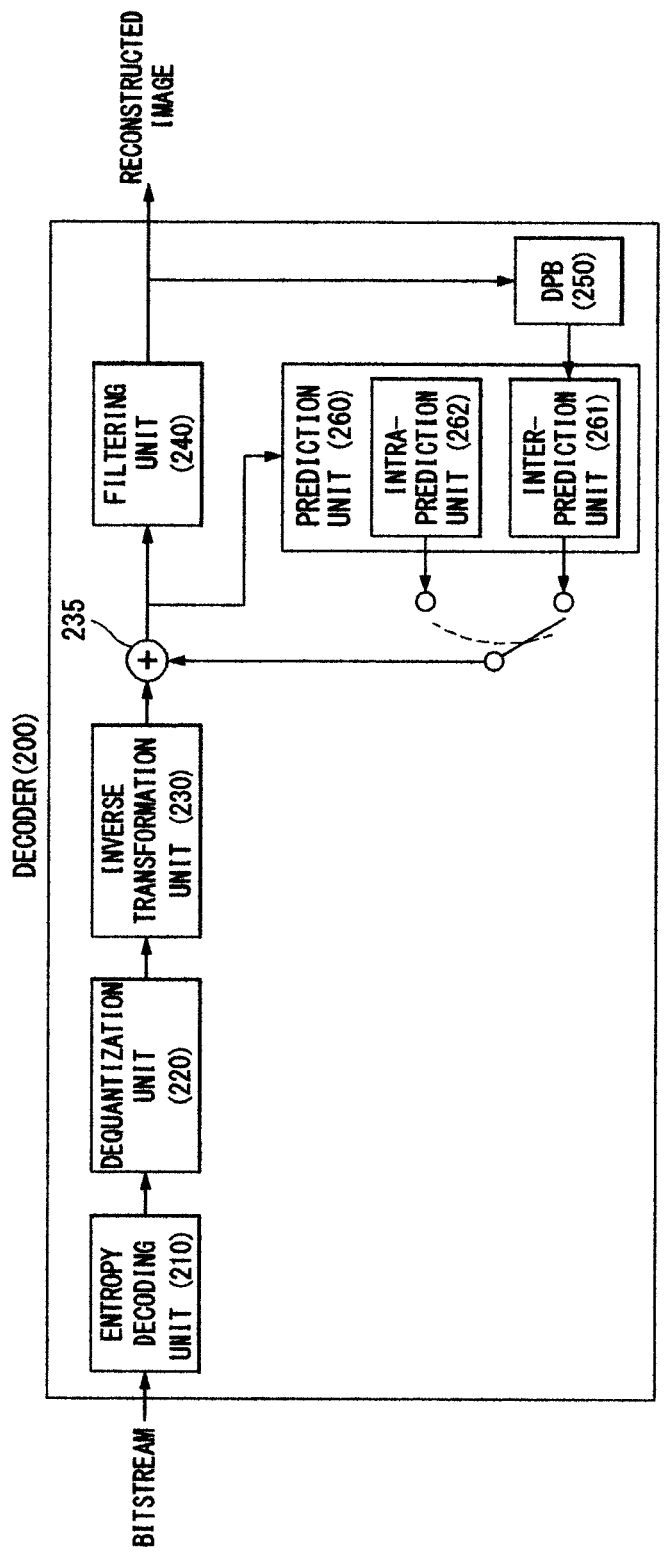

[Fig. 3]
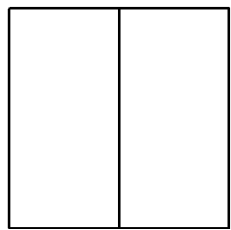 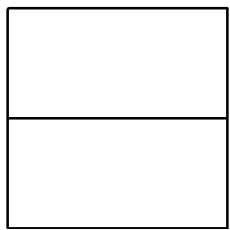 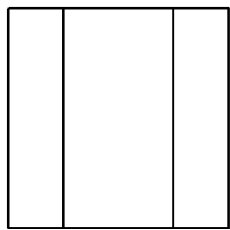 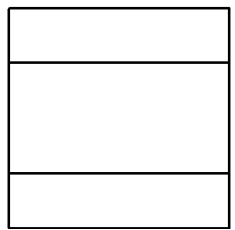
SPLIT_BT_VER    SPLIT_BT_HOR    SPLIT_TT_VER    SPLIT_TT_HOR

[Fig. 4]
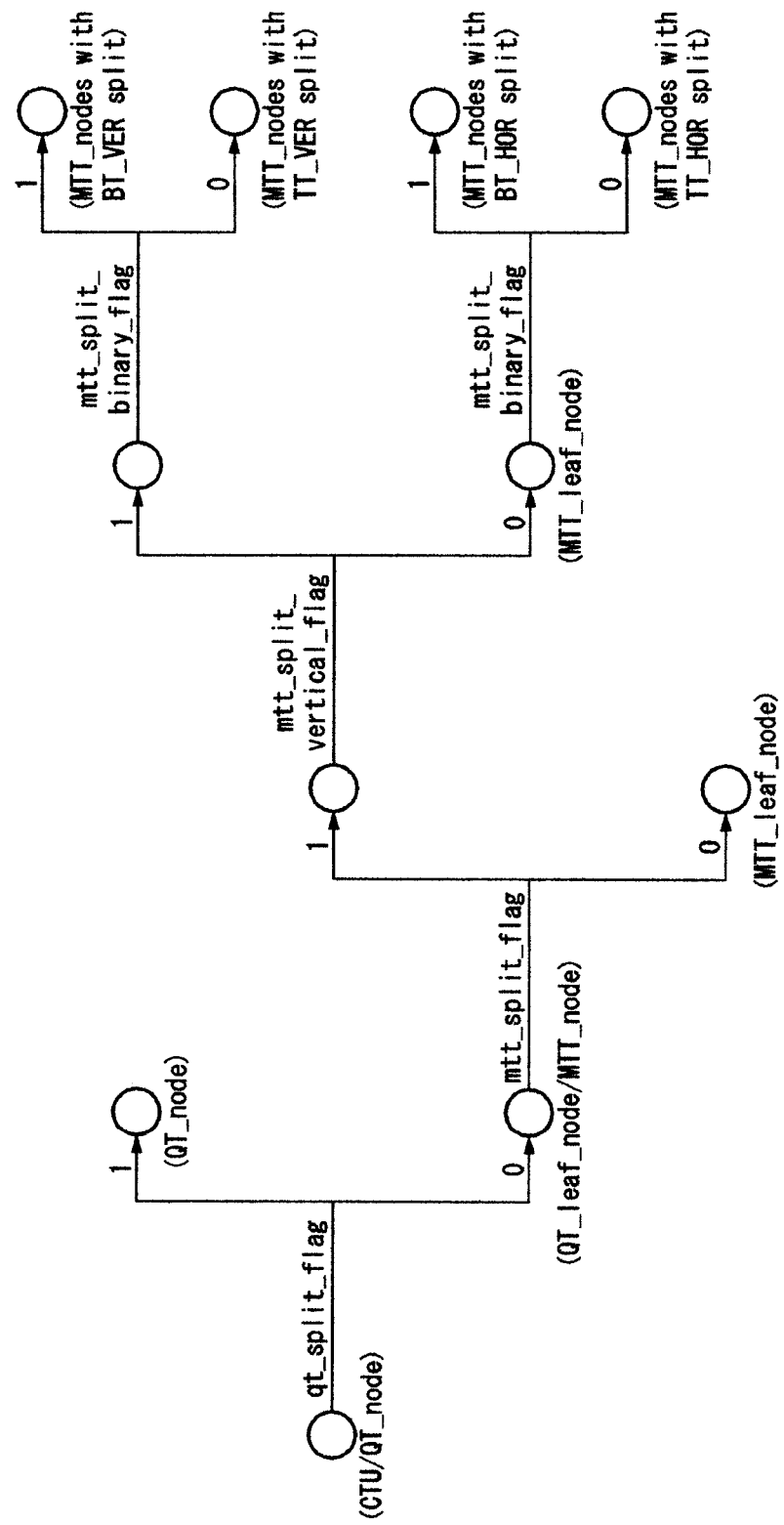

[Fig. 5]
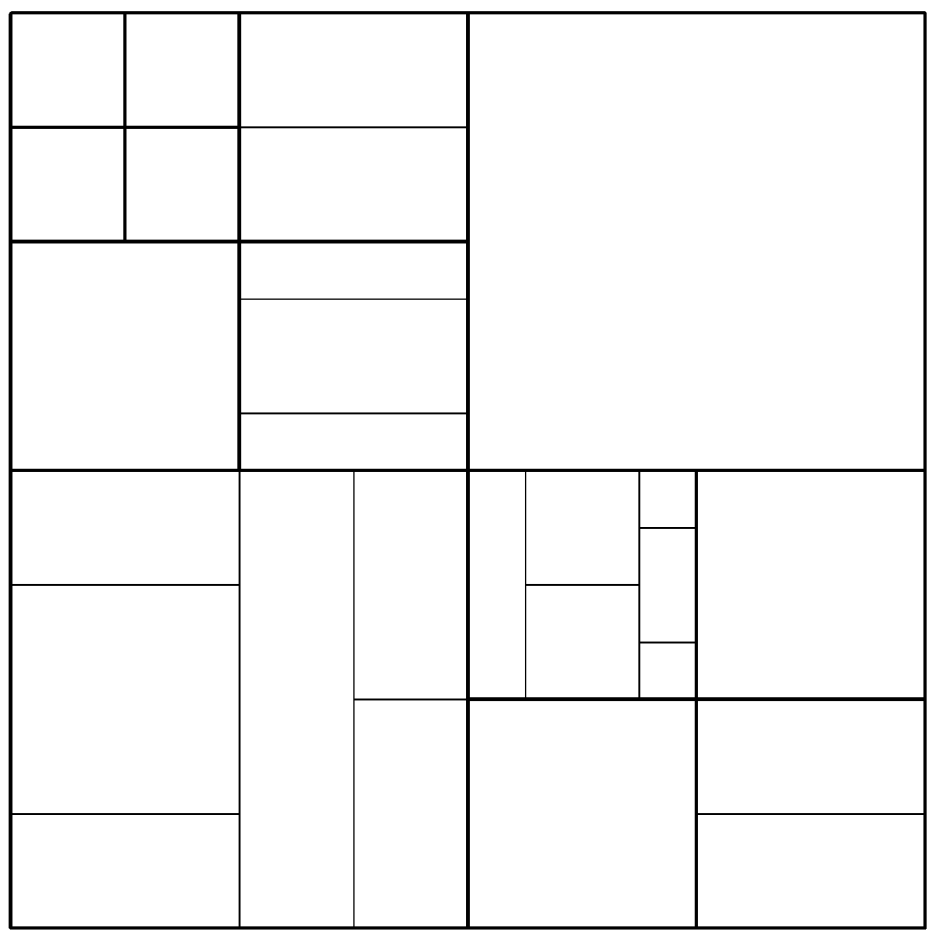

[Fig. 6]
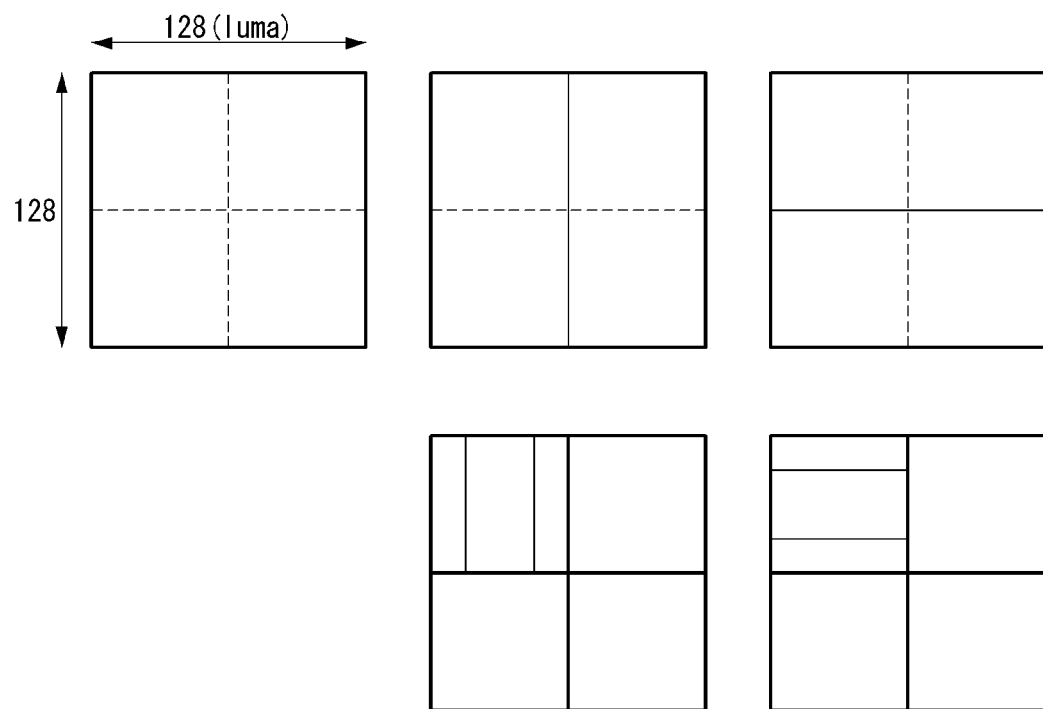
[Fig. 7]
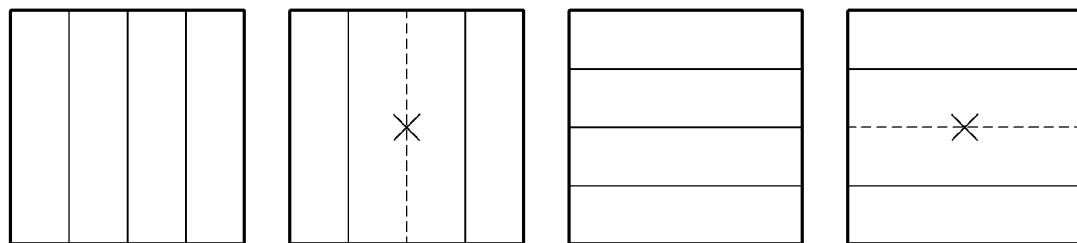

[Fig. 8]
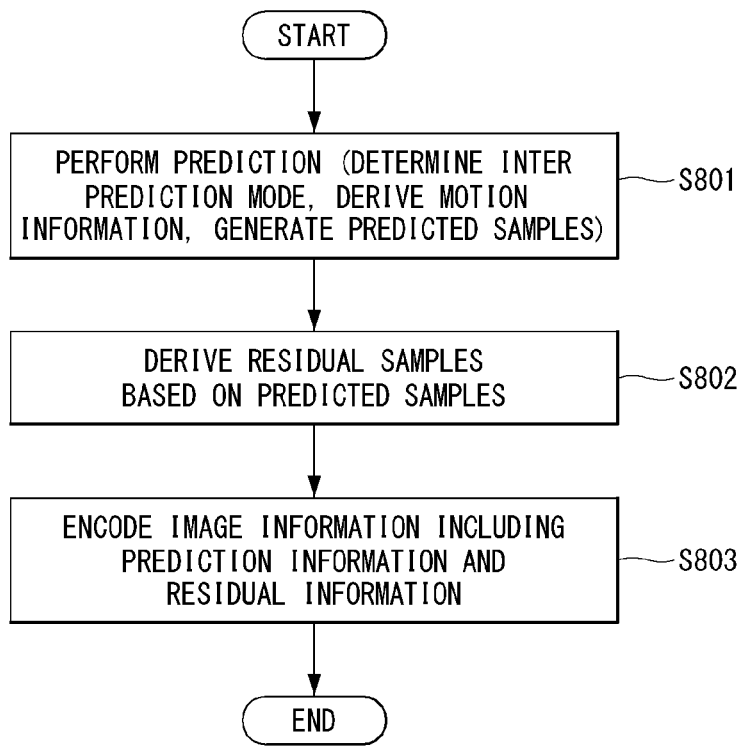
[Fig. 9]
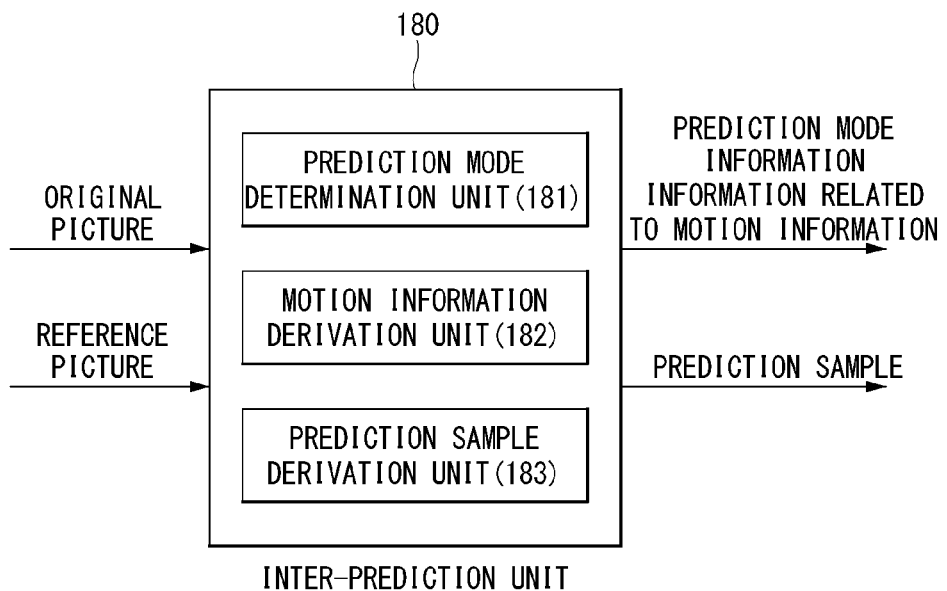

[Fig. 10]
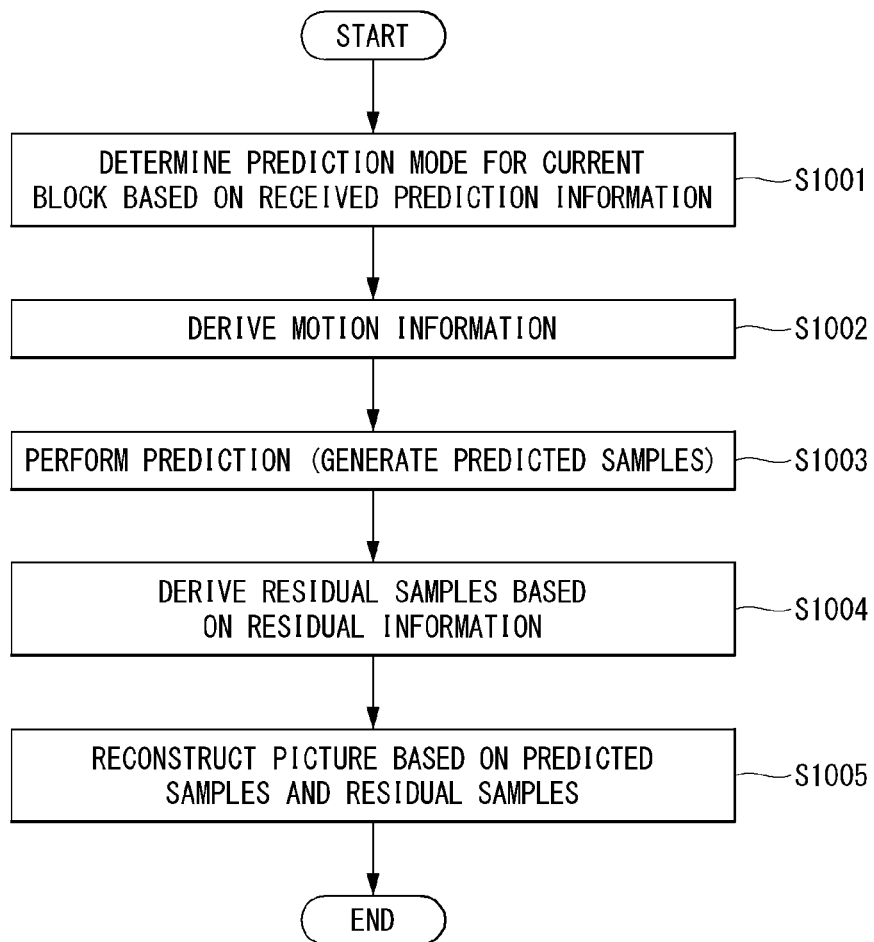

[Fig. 11]
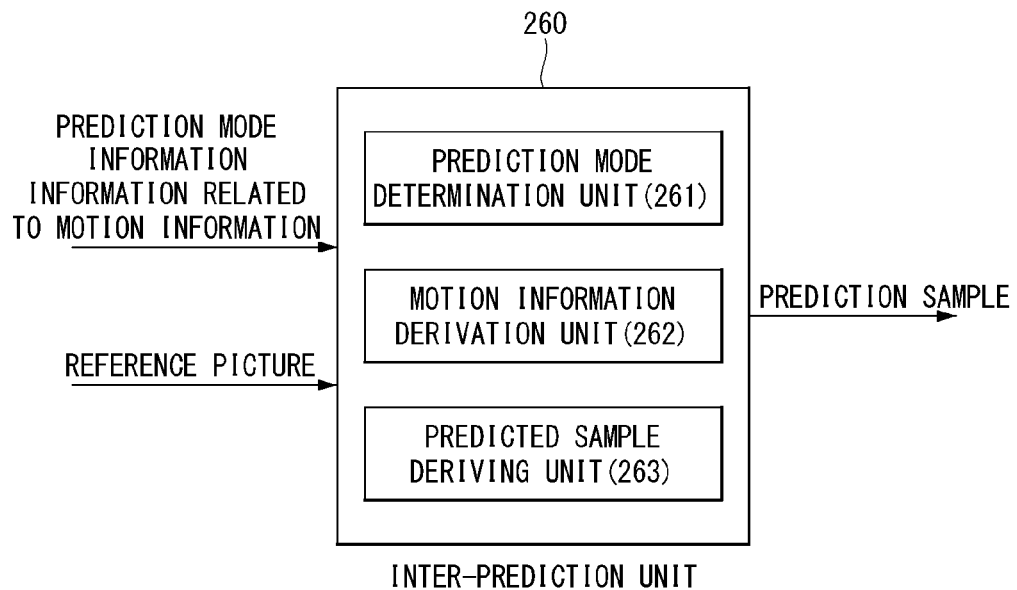
[Fig. 12]
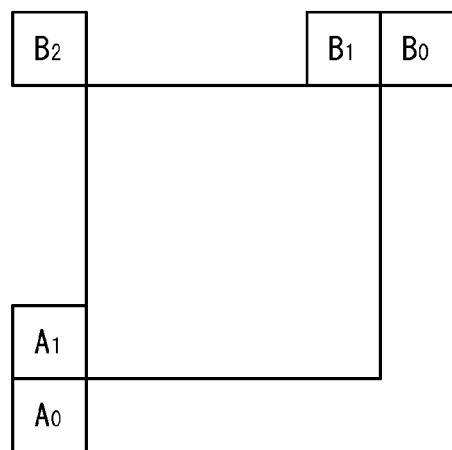

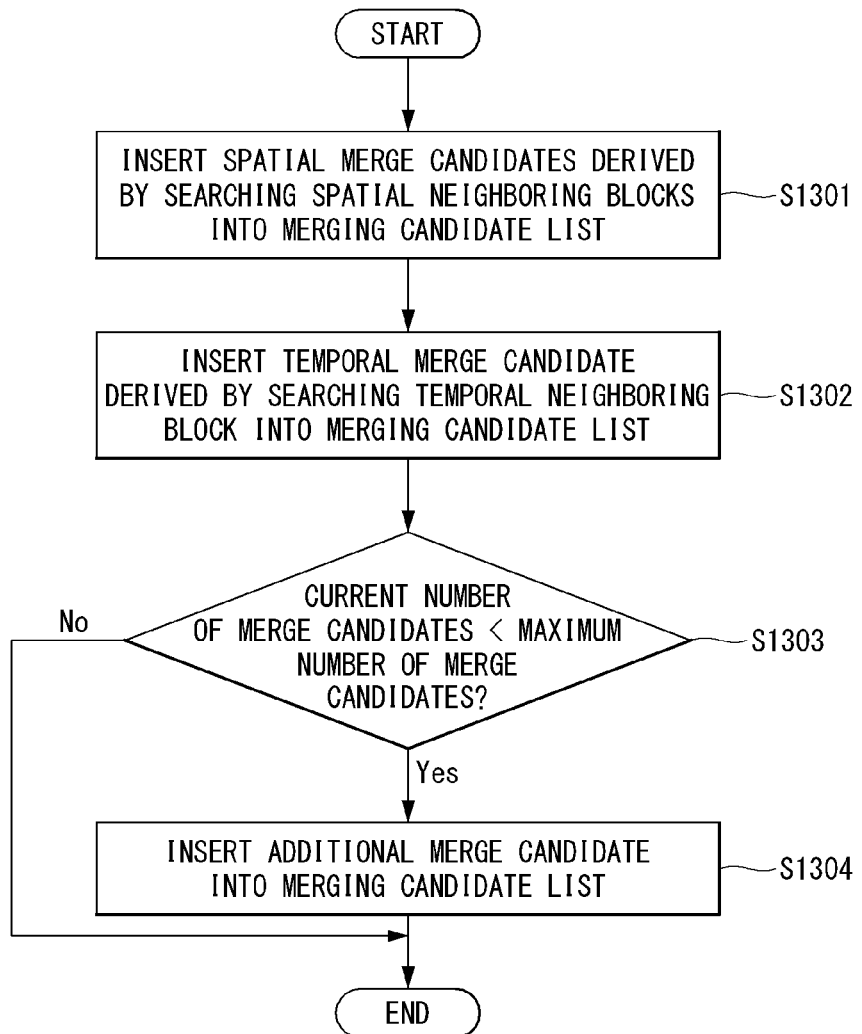
[Fig. 13]

[Fig. 14]
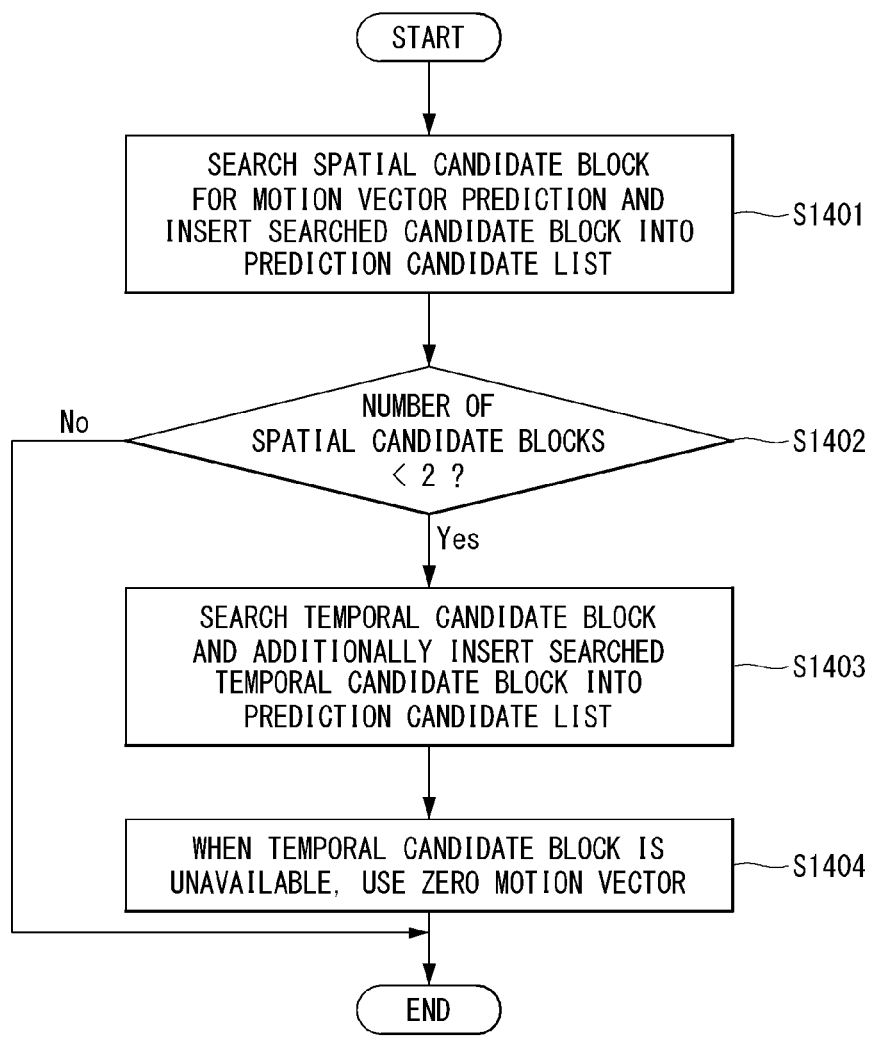

[Fig. 15]
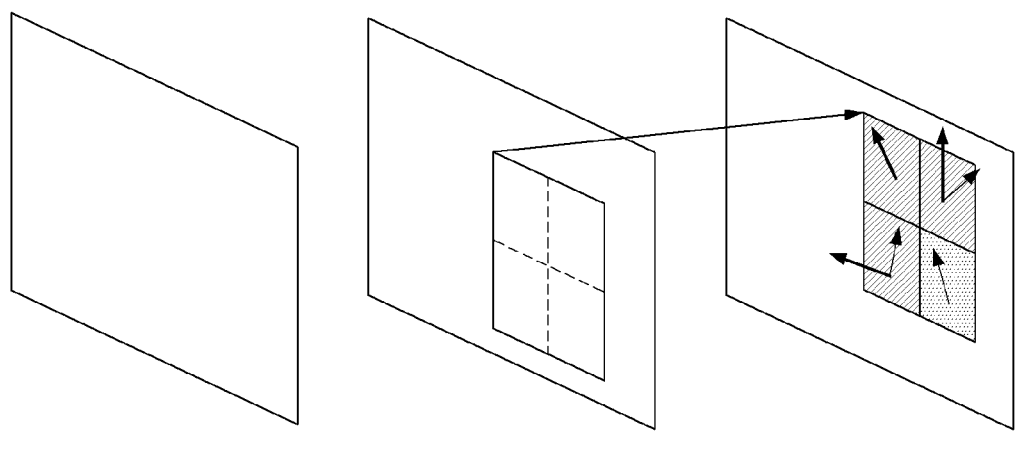
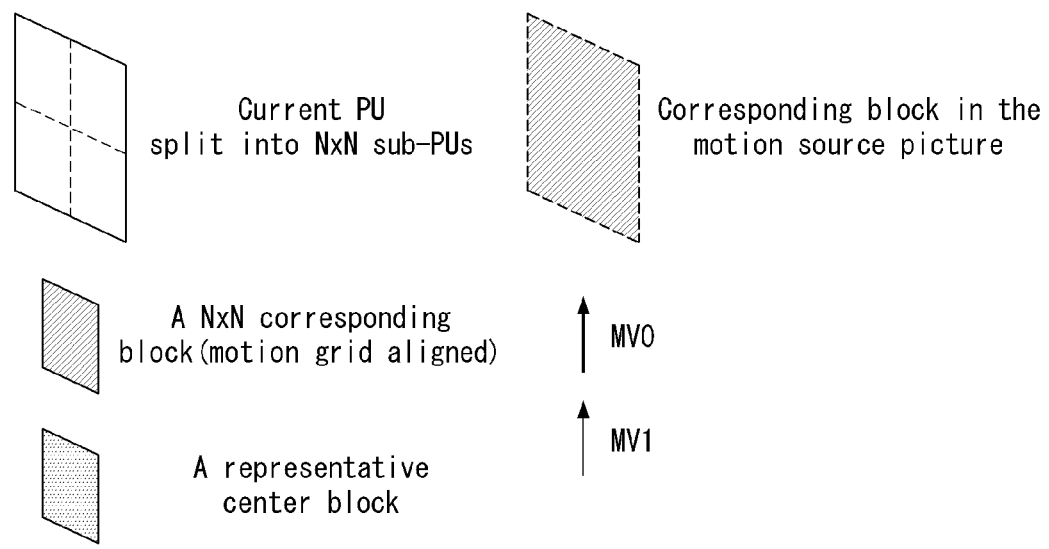

[Fig. 16]
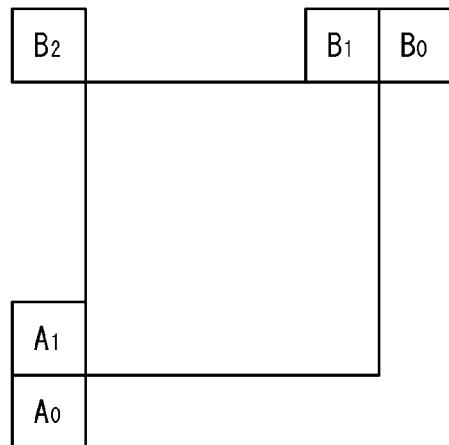
[Fig. 17]
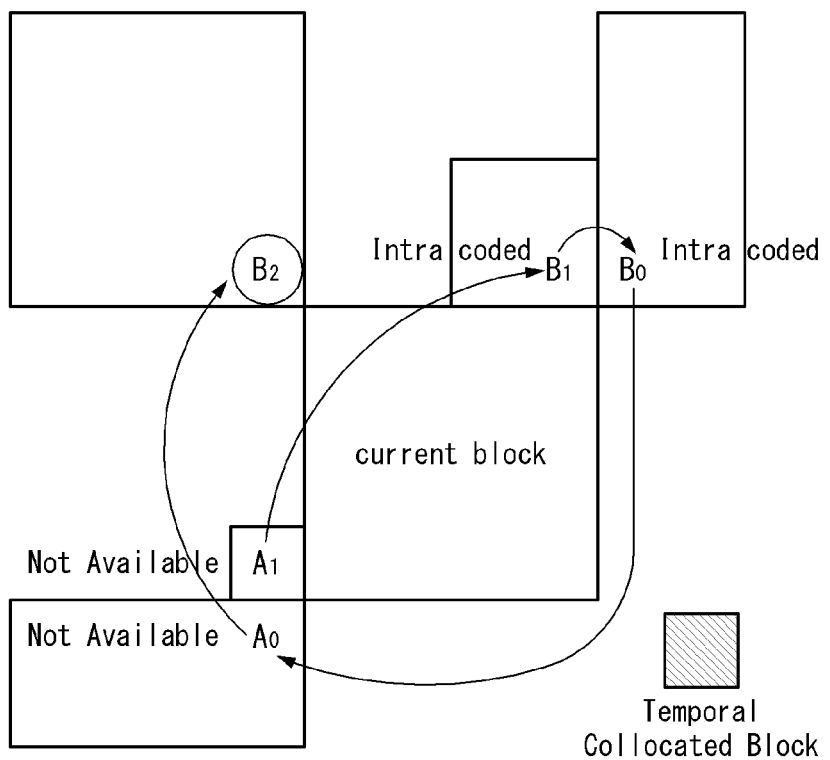

[Fig. 18]
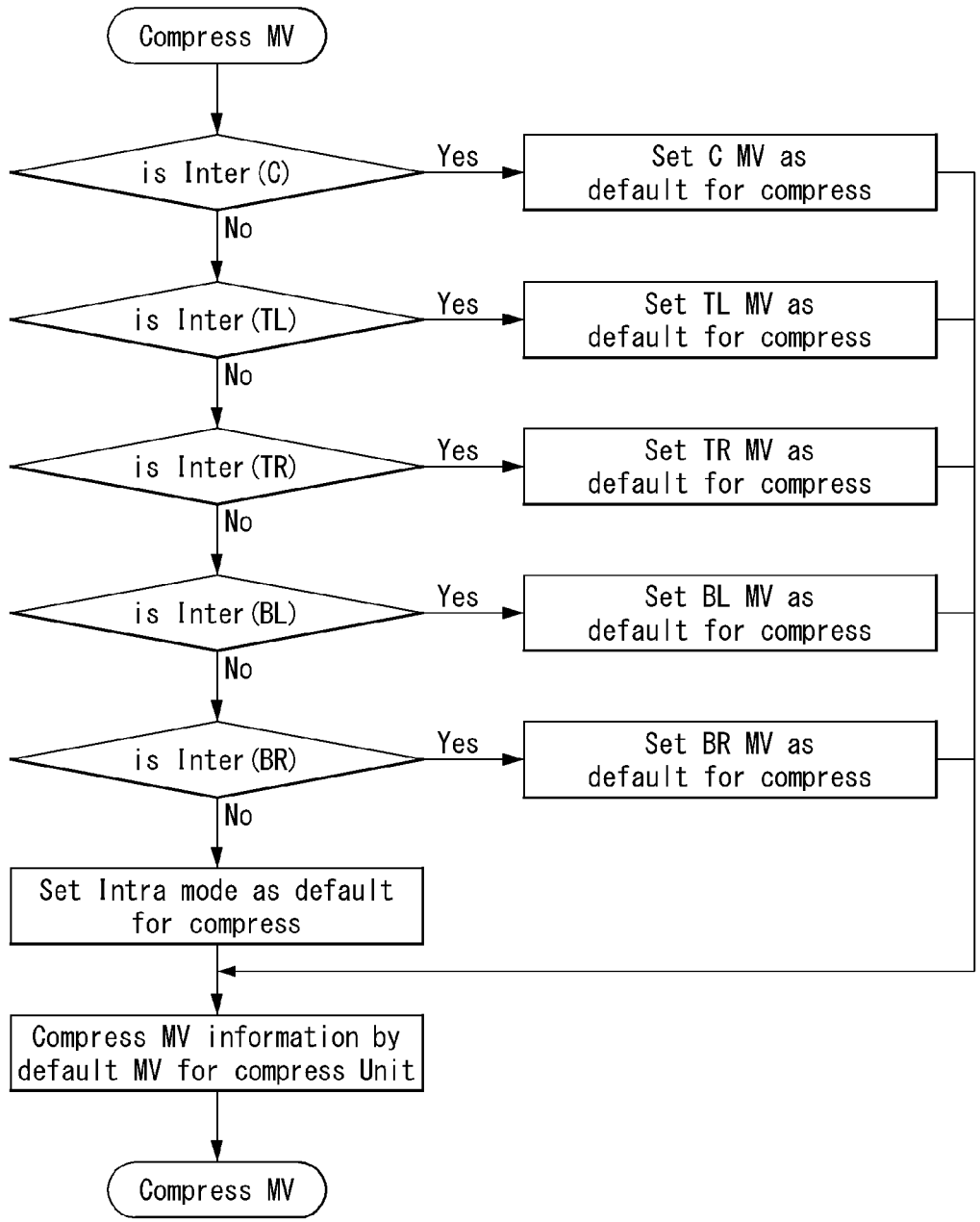

[Fig. 19]
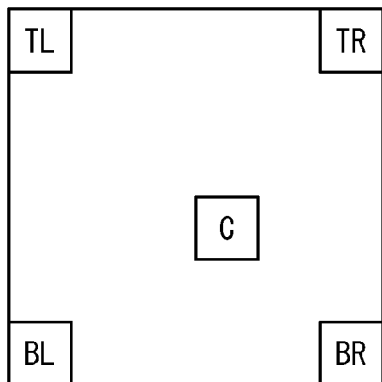
[Fig. 20]
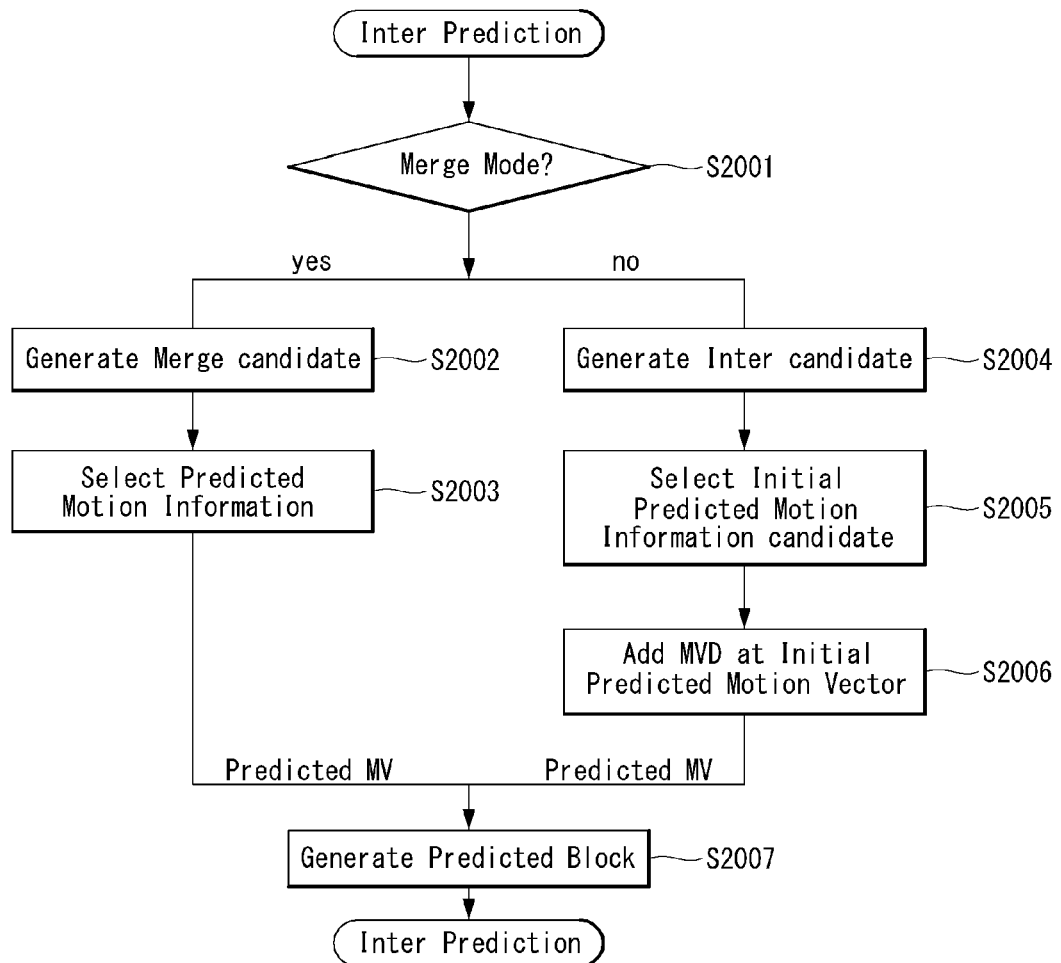

[Fig. 21]
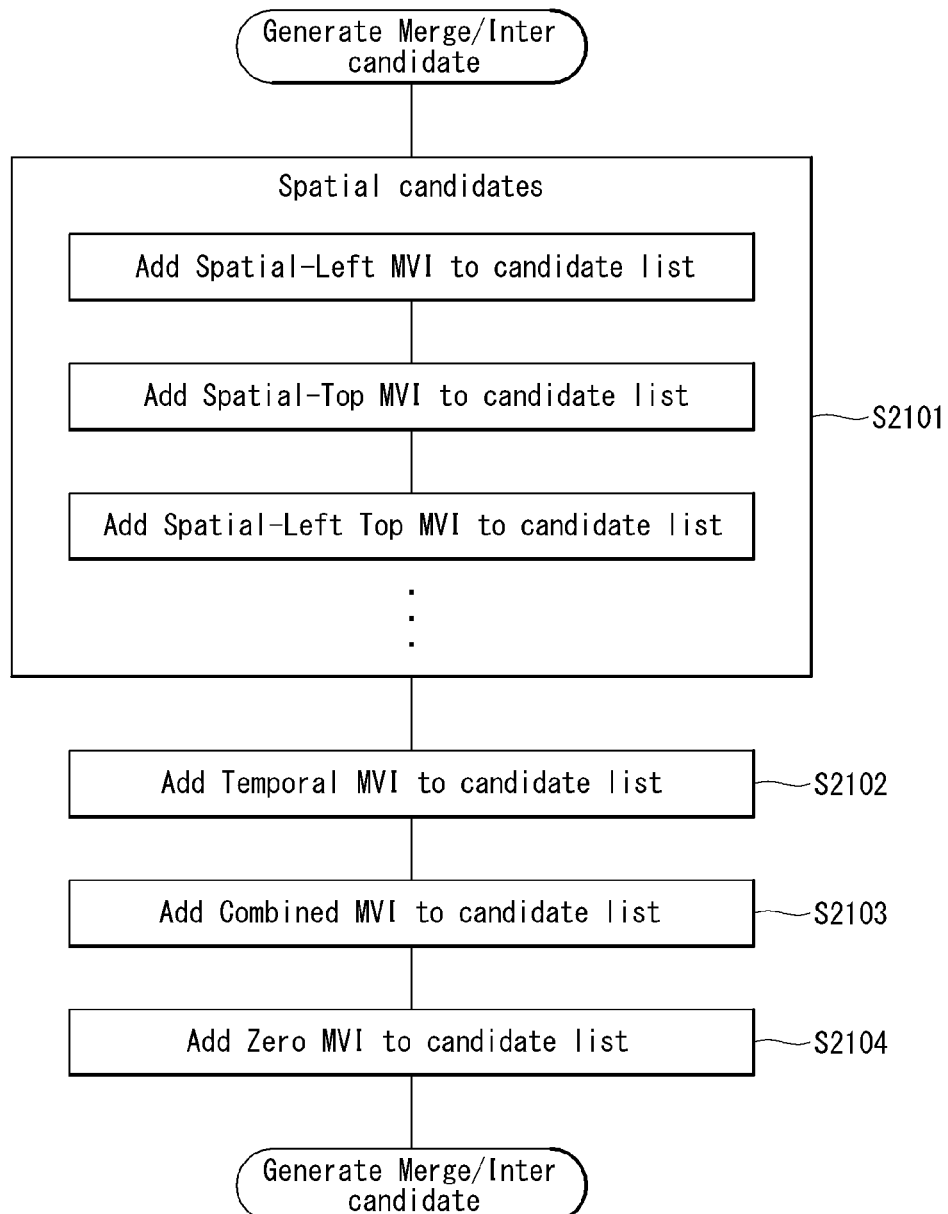

[Fig. 22]
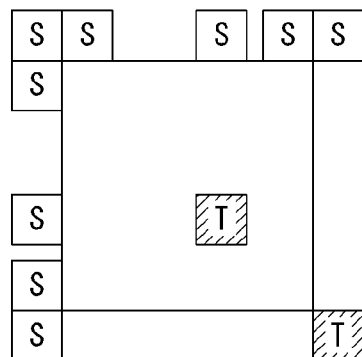
[Fig. 23]
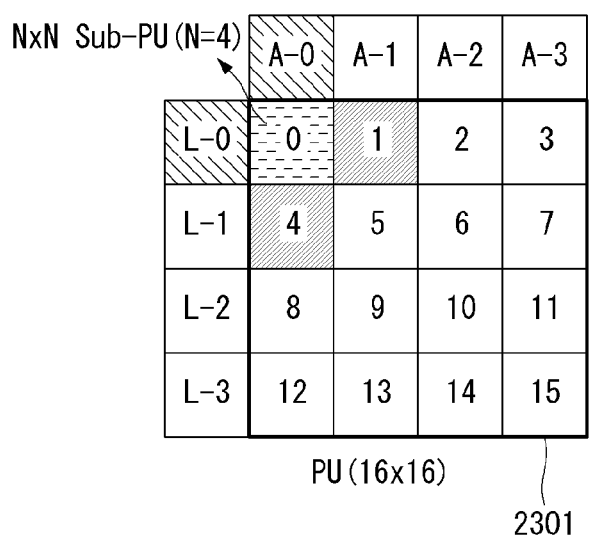

[Fig. 24]
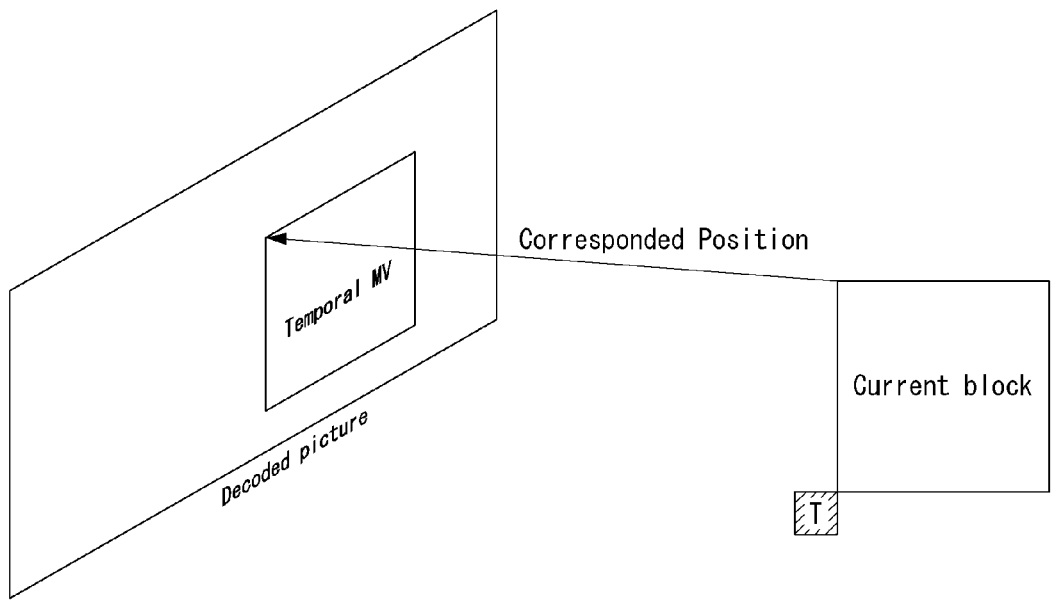
[Fig. 25]
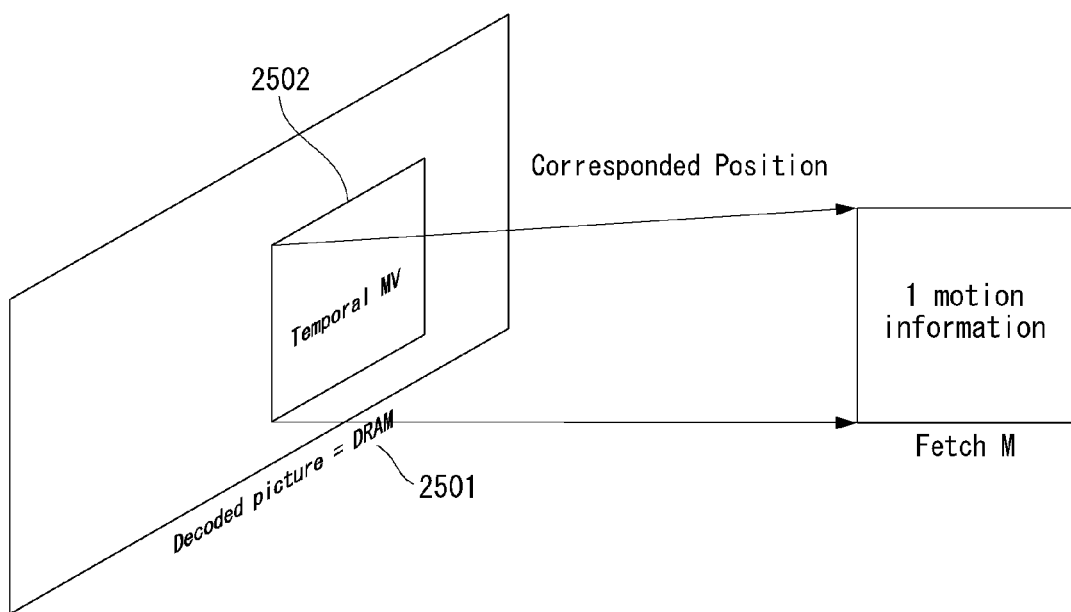

[Fig. 26]
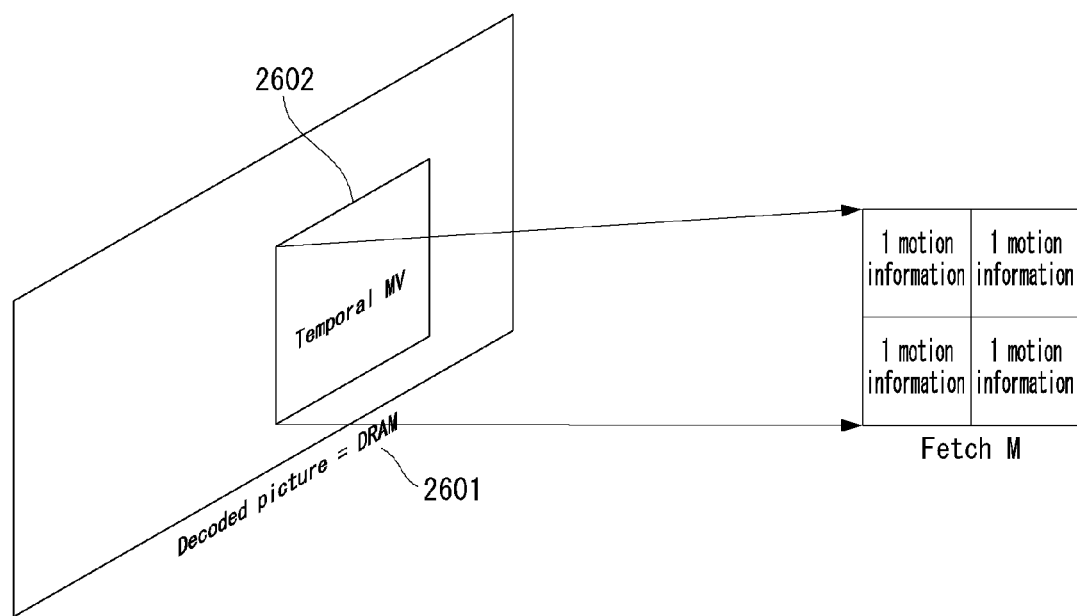

[Fig. 27]
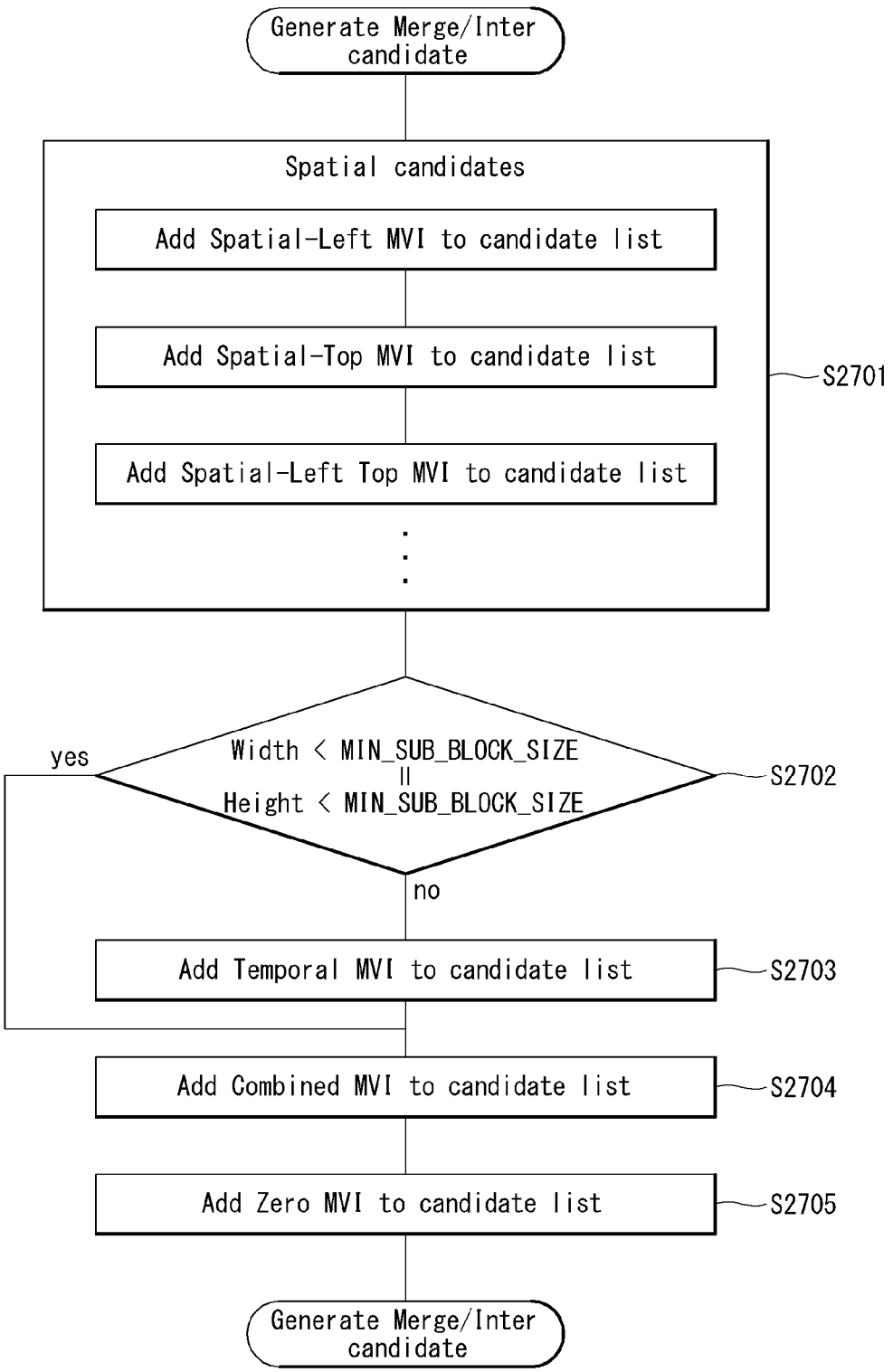

[Fig. 28]
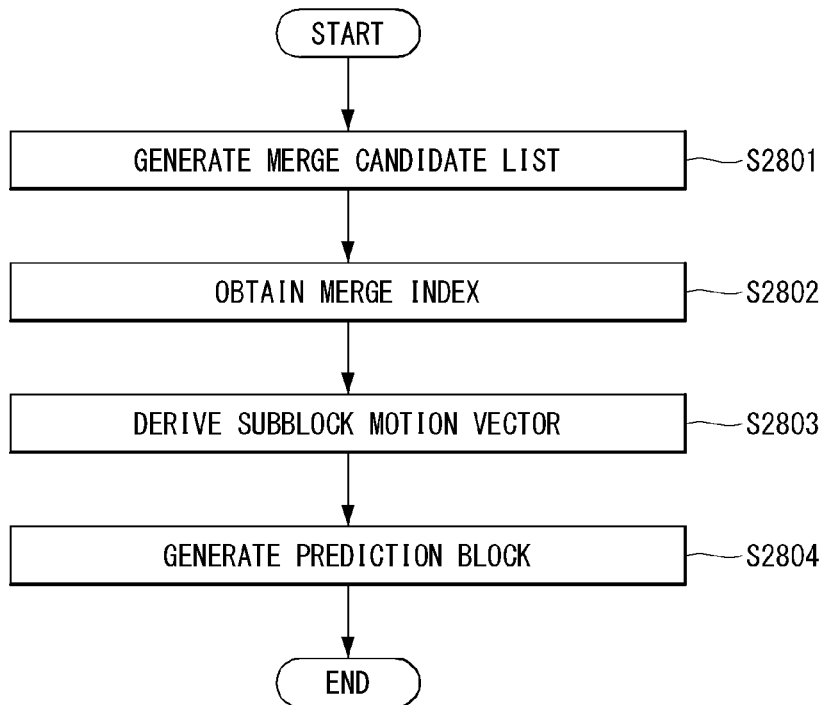
[Fig. 29]
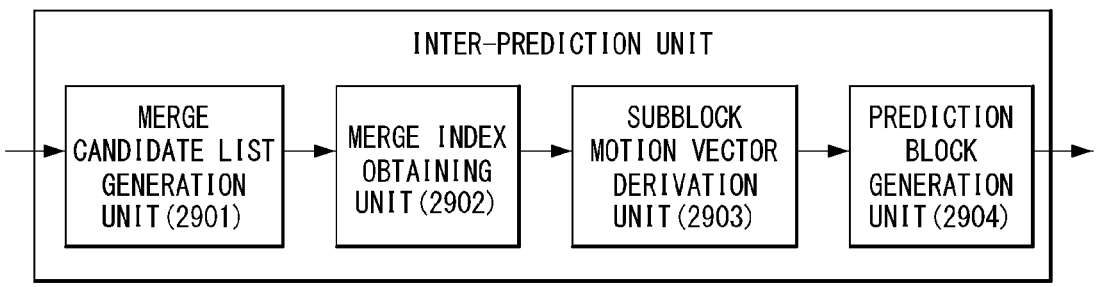

[Fig. 30]
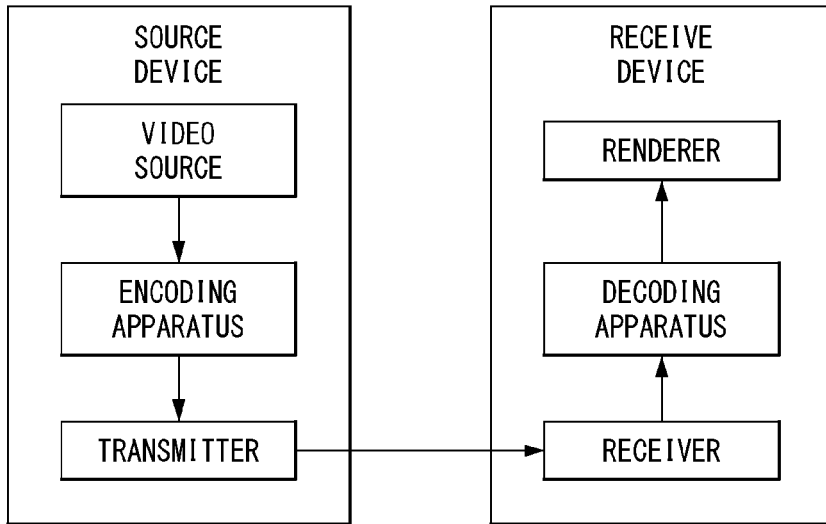
[Fig. 31]
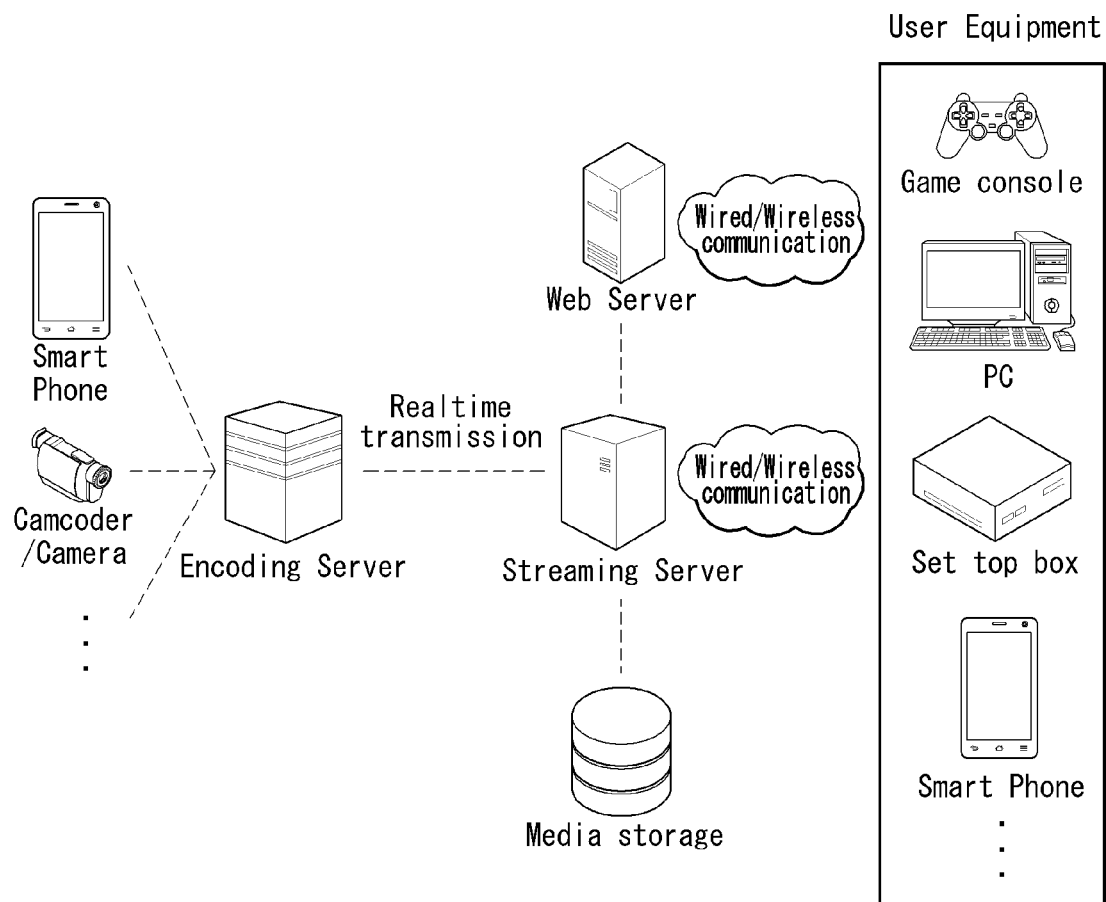

METHOD FOR PROCESSING IMAGE ON BASIS OF INTER-PREDICTION MODE AND DEVICE THEREFOR

CROSS-REFERENCE TO RELATED APPLICATIONS

This application is a Continuation of International Application No. PCT/KR2019/007837, filed on Jun. 27, 2019, which claims the benefit of Korean Patent Application No. 10-2018-0074069, filed on Jun. 27, 2018, the contents of which are all hereby incorporated by reference herein in their entirety.

TECHNICAL FIELD

The present disclosure relates to a still image or moving image processing method and, more particularly, to a method of encoding/decoding a still image or moving image based on an inter prediction mode and an apparatus supporting the same.

BACKGROUND ART

A compression encoding means a series of signal processing techniques for transmitting digitized information through a communication line or techniques for storing the information in a form that is proper for a storage medium. The media including a picture, an image, an audio, and the like may be the target for the compression encoding, and particularly, the technique of performing the compression encoding targeted to the picture is referred to as a video image compression.

The next generation video contents are supposed to have the characteristics of high spatial resolution, high frame rate and high dimensionality of scene representation. In order to process such contents, drastic increase of memory storage, memory access rate and processing power will be resulted.

Accordingly, it is required to design the coding tool for processing the next generation video contents efficiently.

DISCLOSURE

Technical Problem

An embodiment of the present disclosure provides a hardware friendly algorithm for using motion information of an already decoded picture in performing an inter prediction (or inter-picture prediction) based on a similarity of temporal motion information.

The technical objects of the present disclosure are not limited to the aforementioned technical objects, and other technical objects, which are not mentioned above, will be apparently appreciated by a person having ordinary skill in the art from the following description.

Technical Solution

In an aspect of the present disclosure, a method for decoding an image based on an inter prediction mode comprises: if a merge mode is applied to a current block, generating a merge candidate list by using a spatial neighboring block and a temporal neighboring block of the current block; obtaining a merge index indicating a candidate to be used for an inter prediction of the current block in the merge candidate list; deriving a motion vector of each of subblocks included in the current block based on a motion vector of the candidate used for the inter prediction of the current block; and generating a prediction sample of the current block by using the motion vector of each of subblocks, wherein a size of the subblock may be set to a fixed size which is equal to or greater than 8×8.

As an embodiment, the generating of the merge candidate list may comprise adding a temporal neighboring block of the current block specified by the motion vector of the spatial neighboring block in a collocated picture of the current block to the merge candidate list.

As an embodiment, the generating of the merge candidate list may comprise adding to the merge candidate list the temporal neighboring block of the current block specified by the motion vector of a first spatial neighboring block in a predefined order among the spatial neighboring blocks of the current block in the collocated picture of the current block.

As an embodiment, the generating of the merge candidate list may comprise identifying whether a width and a height of the current block is smaller than a pre-defined minimum size; and if the width and the height of the current block is greater than or equal to the pre-defined minimum size as a result of the identification, adding a temporal neighboring block of the current block specified by a motion vector of the spatial neighboring block in the collocated picture of the current block to the merge candidate list.

As an embodiment, the pre-defined minimum size may be set to the size of the subblock.

In another aspect of the present disclosure, an apparatus for decoding an image based on an inter prediction mode comprises: a merge candidate list generation unit for, if a merge mode is applied to a current block, generating a merge candidate list by using a spatial neighboring block and a temporal neighboring block of the current block; a merge index obtaining unit for obtaining a merge index indicating a candidate to be used for an inter prediction of the current block in the merge candidate list; a subblock motion vector derivation unit for deriving a motion vector of each subblocks included in the current block based on a motion vector of the candidate used for the inter prediction of the current block; and a prediction block generation unit for generating a prediction sample of the current block by using the motion vector of each subblocks, in which a size of the subblock may be set to a fixed size which is equal to or greater than 8×8.

As an embodiment, the merge candidate list generation unit may add a temporal neighboring block of the current block specified by a motion vector of a spatial neighboring block in a collocated picture of the current block to the merge candidate list.

As an embodiment, the merge candidate list generation unit may add a temporal neighboring block of the current block specified by a motion vector of a first spatial neighboring block according to a pre-defined order in a collocated picture of the current block to the merge candidate list.

As an embodiment, the merge candidate list generation unit may identify whether a width and a height of the current block is smaller than a pre-defined minimum size, and if the width and the height of the current block is greater than or equal to the pre-defined minimum size as a result of the identification, add a temporal neighboring block of the current block specified by a motion vector of the spatial neighboring block in the collocated picture of the current block to the merge candidate list.

As an embodiment, the pre-defined minimum size may be set to the size of the subblock.

Advantageous Effects

According to an embodiment of the present disclosure, a hardware gate count can be effectively reduced in performing a prediction block by using motion information of an already decoded picture.

Furthermore, according to an embodiment of the present disclosure, the hardware gate count can be reduced and loss of compression performance caused by the reduction of the hardware gate count can be minimized in performing an inter prediction by using the motion information of the already decoded picture.

Effects obtainable in the present disclosure are not limited to the aforementioned effects and other unmentioned effects will be clearly understood by those skilled in the art from the following description.

DESCRIPTION OF DRAWINGS

In order to help understanding of the present disclosure, the accompanying drawings which are included as a part of the Detailed Description provide embodiments of the present disclosure and describe the technical features of the present disclosure together with the Detailed Description.

FIG. 1 is a schematic block diagram of an encoding device in which encoding of a video/image signal is performed as an embodiment to which the present disclosure is applied.

FIG. 2 is a schematic block diagram of a decoding device in which decoding of a video/image signal is performed as an embodiment to which the present disclosure is applied.

FIG. 3 is a diagram illustrating an example of a multi-type tree structure as an embodiment to which the present disclosure may be applied.

FIG. 4 is a diagram illustrating a signaling mechanism of partition partitioning information of a quadtree with nested multi-type tree structure as an embodiment to which the present disclosure may be applied.

FIG. 5 is a diagram illustrating a method for partitioning a CTU into multiple CUs based on a quadtree and nested multi-type tree structure as an embodiment to which the present disclosure may be applied.

FIG. 6 is a diagram illustrating a method for limiting ternary-tree partitioning as an embodiment to which the present disclosure may be applied.

FIG. 7 is a diagram illustrating redundant partitioning patterns which may occur in binary-tree partitioning and ternary-tree partitioning as an embodiment to which the present disclosure may be applied.

FIGS. 8 and 9 are diagrams illustrating an inter prediction based video/image encoding method according to an embodiment of the present disclosure and an inter prediction unit in an encoding device according to an embodiment of the present disclosure.

FIGS. 10 and 11 are diagrams illustrating an inter prediction based video/image decoding method according to an embodiment of the present disclosure and an inter prediction unit in a decoding device according to an embodiment of the present disclosure.

FIG. 12 is a diagram for describing a neighboring block used in a merge mode or a skip mode as an embodiment to which the present disclosure is applied.

FIG. 13 is a flowchart illustrating a method for configuring a merge candidate list according to an embodiment to which the present disclosure is applied.

FIG. 14 is a flowchart illustrating a method for configuring a merge candidate list according to an embodiment to which the present disclosure is applied.

FIGS. 15 and 16 are diagrams for describing a method for deriving an Advanced Temporal Motion Vector Prediction (ATMVP) candidate as an embodiment to which the present disclosure is applied.

FIG. 17 is a diagram illustrating a method for deriving an Advanced Temporal Motion Vector Prediction (ATMVP) candidate as an embodiment to which the present disclosure is applied.

FIGS. 18 and 19 are diagrams illustrating a method for compression temporal motion vector data and locations of spatial candidates used therefor according to an embodiment of the present disclosure.

FIG. 20 is a flowchart showing a method for generating an inter prediction block based on a candidate list according to an embodiment to which the present disclosure is applied.

FIG. 21 is a flowchart illustrating a method for generating a candidate list according to an embodiment to which the present disclosure is applied.

FIG. 22 illustrates one example of a neighboring block used for an inter prediction according to an embodiment to which the present disclosure is applied.

FIG. 23 is a diagram illustrating a method for deriving an extended Advanced Temporal Motion Vector Prediction (ATMVP) candidate according to an embodiment to which the present disclosure is applied.

FIGS. 24 and 25 are diagrams illustrating a fetching process of fetching a motion vector of a temporal neighboring block in a reference picture according to an embodiment to which the present disclosure is applied.

FIG. 26 is a diagram illustrating a fetching process of fetching a motion vector of a temporal neighboring block in units of subblocks according to an embodiment to which the present disclosure is applied.

FIG. 27 is a flowchart illustrating a method for generating a candidate list according to an embodiment to which the present disclosure is applied.

FIG. 28 is a flowchart showing a method for generating an inter prediction block according to an embodiment to which the present disclosure is applied.

FIG. 29 is a diagram illustrating an inter prediction device according to an embodiment to which the present disclosure is applied.

FIG. 30 illustrates a video coding system to which the present disclosure is applied.

FIG. 31 is an architectural diagram of a content streaming system as an embodiment to which the present disclosure is applied.

MODE FOR INVENTION

Hereinafter, preferred embodiments of the disclosure will be described by reference to the accompanying drawings. The description that will be described below with the accompanying drawings is to describe exemplary embodiments of the disclosure, and is not intended to describe the only embodiment in which the disclosure may be implemented. The description below includes particular details in order to provide perfect understanding of the disclosure. However, it is understood that the disclosure may be embodied without the particular details to those skilled in the art.

In some cases, in order to prevent the technical concept of the disclosure from being unclear, structures or devices which are publicly known may be omitted, or may be depicted as a block diagram centering on the core functions of the structures or the devices.

Further, although general terms widely used currently are selected as the terms in the disclosure as much as possible, a term that is arbitrarily selected by the applicant is used in a specific case. Since the meaning of the term will be clearly described in the corresponding part of the description in such a case, it is understood that the disclosure will not be simply interpreted by the terms only used in the description of the disclosure, but the meaning of the terms should be figured out.

Specific terminologies used in the description below may be provided to help the understanding of the disclosure. Furthermore, the specific terminology may be modified into other forms within the scope of the technical concept of the disclosure. For example, a signal, data, a sample, a picture, a frame, a block, etc may be properly replaced and interpreted in each coding process.

Hereinafter, in this disclosure, a "processing unit" means a unit by which an encoding/decoding processing process, such as prediction, transform and/or quantization, is performed. Hereinafter, for convenience of description, a processing unit may also be called a "processing block" or "block."

A processing unit may be construed as a meaning including a unit for a luma component and a unit for a chroma component. For example, a processing unit may correspond to a coding tree unit (CTU), a coding unit (CU), a prediction unit (PU) or a transform unit (TU).

Furthermore, a processing unit may be construed as a unit for a luma component or a unit for a chroma component. For example, a processing unit may correspond to a coding tree block (CTB), coding block (CB), prediction block (PB) or transform block (TB) for a luma component. Alternatively, a processing unit may correspond to a coding tree block (CTB), coding block (CB), prediction block (PB) or transform block (TB) for a chroma component. Furthermore, the disclosure is not limited thereto, and a processing unit may be construed as a meaning including a unit for a luma component and a unit for a chroma component.

Furthermore, a processing unit is not essentially limited to a block of a square, but may have a polygon form having three or more vertexes.

Furthermore, hereinafter, in this disclosure, a pixel or pixel element is collected referred to as a sample. Furthermore, using a sample may mean using a pixel value or a pixel element value.

FIG. 1 is a schematic block diagram of an encoding device in which encoding of a video/image signal is performed as an embodiment to which the present disclosure is applied.

Referring to FIG. 1, the encoding device 100 may be configured to include an image partitioning unit 110, a subtraction unit 115, a transformation unit 120, a quantization unit 130, a dequantization unit 140, an inverse transformation unit 150, an addition unit 155, a filtering unit 160, a memory 170, an inter-prediction unit 180, an intra-prediction unit 185, and an entropy encoding unit 190. The inter-prediction unit 180 and the intra-prediction unit 185 may be collectively referred to as a prediction unit. In other words, the prediction unit may include the inter-prediction unit 180 and the intra-prediction unit 185. The transformation unit 120, the quantization unit 130, the dequantization unit 140, and the inverse transformation unit 150 may be included in a residual processing unit. The residual processing unit may further include the subtraction unit 115. As an embodiment, the image partitioning unit 110, the subtraction unit 115, the transformation unit 120, the quantization unit 130, the dequantization unit 140, the inverse transformation unit 150, the addition unit 155, the filtering unit 160, the inter-prediction unit 180, the intra-prediction unit 185, and the entropy encoding unit 190 may be configured by one hardware component (e.g., encoder, or processor). Further, the memory 170 may include a decoded picture buffer (DPB) and may be configured by a digital storage medium.

The image partitioning unit 110 may split an input image (or picture or frame) input into the encoding device 100 into one or more processing units. As one example, the processing unit may be referred to as a coding unit (CU). In this case, the coding unit may be recursively partitioned according to a quadtree binary-tree structure from a coding tree unit (CTU) or a largest coding unit (LCU). For example, one coding unit may be partitioned into a plurality of coding units having a deeper depth based on a quadtree structure and/or a binary-tree structure. In this case, for example, the quadtree structure may be first applied and the binary-tree structure may be applied later. Alternatively, the binary-tree structure may also be first applied. A coding procedure according to the present disclosure may be performed based on a final coding unit which is not divided any longer. In this case, a largest coding unit may be directly used as the final coding unit based on coding efficiency depending on an image characteristic or as necessary, the coding unit is recursively divided into coding units having a still deeper depth, and as a result, a coding unit having an optimal size may be used as the final coding unit. Here, the coding procedure may include procedures including prediction, transform, and reconstruction to be described below. As another example, the processing unit may further include a prediction unit (PU) or a transform unit (TU). In this case, each of the prediction unit and the transform unit may be divided or partitioned from the final coding unit described above. The prediction unit may be a unit of sample prediction and the transform unit may be a unit of deriving a transform coefficient and/or a unit of deriving a residual signal from the transform coefficient.

The unit may be used in combination with a term such as a block or area in some cases. In a general case, an M×N block may indicate a set of samples or transform coefficients constituted by M columns and N rows. The sample may generally indicate a pixel or a value of the pixel, indicate only a pixel/pixel value of a luma component, and indicate only a pixel/pixel value of a chroma component. In the case of the sample, one picture (or image) may be used as a term corresponding to the pixel or pel.

The encoding device 100 subtracts a prediction signal (or a prediction block or a prediction sample array) output from the inter-prediction unit 180 or the intra-prediction unit 185 from the input image signal to generate a residual signal (or a residual block or a residual sample array) and the generated residual signal is transmitted to the transformation unit 120. In this case, as illustrated, in the encoding device 100, a unit subtracting a prediction signal (prediction block or prediction sample array) from the input image signal (original block or original sample array) may be referred to as the subtraction unit 115. The prediction unit may perform prediction for a processing target block (hereinafter, referred to as a current block) and generate a prediction block including prediction samples for the current block. The prediction unit may determine whether intra prediction is applied or inter prediction is applied in units of the current block or CU. The prediction unit may generate various information on prediction, such as prediction mode information and transfer the generated various information to the entropy encoding unit 190 as described below in describing each prediction mode. The information on the prediction may be encoded by the entropy encoding unit 190 and output in the form of a bitstream.

The intra-prediction unit 185 may predict the current block by referring to samples in the current picture. The referred samples may be positioned in the neighborhood of the current block or positioned apart from the current block according to the prediction mode. In the intra prediction, the prediction modes may include a plurality of non-directional modes and a plurality of directional modes. The non-directional mode may include, for example, a DC mode and a planar mode. The directional mode may include, for example, 33 directional prediction modes or 65 directional prediction modes according to a minuteness degree of the prediction direction. However, this is an example and directional prediction modes of a number equal thereto or more therethan or equal thereto or less therethan may be used according to a configuration. The intra-prediction unit 185 may determine the prediction mode applied to the current block by using the prediction mode applied to the neighboring block.

The inter-prediction unit 180 may derive a prediction block for the current block based on a reference block (reference sample array) specified by a motion vector on the reference picture. In this case, in order to reduce an amount of motion information transmitted in the inter-prediction mode, the motion information may be predicted in units of a block, a subblock, or a sample based on a correlation of the motion information between the neighboring block and the current block. The motion information may include a motion vector and a reference picture index. The motion information may further include inter-prediction direction (L0 prediction, L1 prediction, Bi prediction, etc.) information. In the case of the inter prediction, the neighboring block may include a spatial neighboring block which is present in the current picture and a temporal neighboring block which is present in the reference picture. A reference picture including the reference block and a reference picture including the temporal neighboring block may be the same as each other or different from each other. The temporal neighboring block may be referred to as a name such as a collocated reference block, a collocated CU (colCU), etc., and the reference picture including the temporal neighboring block may be referred to as a collocated picture (colPic). For example, the inter-prediction unit 180 may configure a motion information candidate list based on the neighboring blocks and generate information indicating which candidate is used in order to derive the motion vector and/or the reference picture index of the current block. The inter prediction may be performed based on various prediction modes and for example, in the case of a skip mode and a merge mode, the inter-prediction unit 180 may use the motion information of the neighboring block as the motion information of the current block. In the case of the skip mode, the residual signal may not be transmitted unlike the merge mode. In the case of a motion vector prediction (MVP) mode, the motion vector of the neighboring block is used as a motion vector predictor and a motion vector difference is signaled to indicate the motion vector of the current block.

A prediction signal generated through the inter-prediction unit 180 or the intra-prediction unit 185 may be used for generating a reconstruction signal or used for generating the residual signal.

The transformation unit 120 may generate transform coefficients by applying a transform technique to the residual signal. For example, the transform technique may include at least one of Discrete Cosine Transform (DCT), Discrete Sine Transform (DST), Karhunen-Loeve Transform (KLT), Graph-Based Transform (GBT), or Conditionally Non-linear Transform (CNT). Here, when relationship information between pixels is expressed by a graph, the GBT means a transform obtained from the graph. The CNT means a transform which generates the prediction signal by using all previously reconstructed pixels and is acquired based on the generated prediction signal. Further, a transform process may be applied to a square pixel block having the same size and applied even to a non-square block having a variable size.

The quantization unit 130 may quantize the transform coefficients and transmit the quantized transform coefficients to the entropy encoding unit 190 and the entropy encoding unit 190 may encode a quantized signal (information on the quantized transform coefficients) and output the encoded quantized signal as the bitstream. Information on the quantized transform coefficients may be referred to as residual information. The quantization unit 130 may rearrange block-type quantized transform coefficients in a 1-dimensional vector type based on a coefficient scan order and generate information on the quantized transform coefficients based on the 1-dimensional vector type quantized transform coefficients. The entropy encoding unit 190 may perform various encoding methods including, for example, exponential Golomb, context-adaptive variable length coding (CAVLC), context-adaptive binary arithmetic coding (CABAC), and the like. The entropy encoding unit 190 may encode information (e.g., values of syntax elements, etc.) required for reconstructing a video/image together or separately in addition to the quantized transform coefficients. The encoded information (e.g., encoded video/image information) may be transmitted or stored in units of a network abstraction layer (NAS) unit in the form of a bitstream. The bitstream may be transmitted via a network or stored in a digital storage medium. Here, the network may include a broadcasting network and/or a communication network and the digital storage medium may include various storage media including USB, SD, CD, DVD, Blu-ray, HDD, SSD, and the like. A transmitter (not illustrated) transmitting and/or a storage (not illustrated) storing a signal output from the entropy encoding unit 190 may be configured as an internal/external element of the encoding device 100 or the transmitter may be a component of the entropy encoding unit 190.

The quantized transform coefficients output from the quantization unit 130 may be used for generating the prediction signal. For example, dequantization and inverse transform are applied to the quantized transform coefficients by the dequantization unit 140 and the inverse transformation unit 150 in a loop to reconstruct the residual signal. The addition unit 155 adds the reconstructed residual signal to the prediction signal output from the inter-prediction unit 180 or the intra-prediction unit 185 to generate a reconstructed signal (a reconstructed picture, a reconstructed block, or a reconstructed sample array). Like the case of applying the skip mode, when there is no residual for the processing target block, the prediction block may be used as the reconstructed block. The addition unit 155 may be referred to as a reconstruction unit or a reconstructed block generation unit. The generated reconstructed signal may be used for intra prediction of a next processing target block in the current picture and used for inter prediction of a next picture through a filtering as described below.

The filtering unit 160 may enhance a subjective/objective image quality by applying filtering to the reconstructed signal. For example, the filtering unit 160 may generate a modified reconstructed picture by applying various filtering methods to the reconstructed picture and store the modified reconstructed picture in the memory 170, specifically, the DPB of the memory 170. The various filtering methods may include, for example, deblocking filtering, a sample adaptive offset, an adaptive loop filter, a bilateral filter, and the like. The filtering unit 160 may generate various information on the filtering and transfer the generated various information to the entropy encoding unit 190 as described below in describing each filtering method. The information on the filtering may be encoded by the entropy encoding unit 190 and output in the form of a bitstream.

The inter-prediction unit 180 may use the modified reconstructed picture transmitted to the memory 170 as the reference picture. When the inter prediction is applied therethrough, the encoding device may avoid a prediction mismatch in the encoding device 100 and the decoding device and also enhance encoding efficiency.

The DPB of the memory 170 may store the modified reconstructed picture in order to use the modified reconstructed picture as the reference picture in the inter-prediction unit 180. The memory 170 may store motion information of a block in which the motion information in the current picture is derived (or encoded) and/or motion information of blocks in an already reconstructed picture. The stored motion information may be transferred to the inter-prediction unit 180 so as to be used as the motion information of the spatial neighboring block or the motion information of the temporal neighboring block. The memory 170 may store reconstructed samples of the reconstructed blocks in the current picture and transfer the stored reconstructed samples to the intra-prediction unit 185.

FIG. 2 is a schematic block diagram of a decoding device in which decoding of a video/image signal is performed as an embodiment to which the present disclosure is applied.

Referring to FIG. 2, the decoding device 200 may be configured to include an entropy decoding unit 210, a dequantization unit 220, an inverse transformation unit 230, an addition unit 235, a filtering unit 240, a memory 250, an inter-prediction unit 260, and an intra-prediction unit 265. The inter-prediction unit 260 and the intra-prediction unit 265 may be collectively referred to as a prediction unit. In other words, the prediction unit may include the inter-prediction unit 260 and the intra-prediction 265. The dequantization unit 220 and the inverse transformation unit 230 may be collectively referred to as a residual processing unit. In other words, the residual processing unit may include the dequantization unit 220 and the inverse transformation unit 230. The entropy decoding unit 210, the dequantization unit 220, the inverse transformation unit 230, the addition unit 235, the filtering unit 240, the inter-prediction unit 260, and the intra-prediction unit 265 may be configured by one hardware component (e.g., a decoder or a processor) according to an embodiment. Further, the memory 170 may include the decoded picture buffer (DPB) and may be configured by a digital storage medium.

When a bitstream including video/image information is input, the decoding device 200 may reconstruct an image to correspond to the process in which the video/image information is processed in the encoding device of FIG. 1. For example, the decoding device 200 may perform decoding by using a processing unit applied in the encoding device. Accordingly, the processing unit of decoding may be, for example, a coding unit and the coding unit may be partitioned from a coding tree unit or a largest coding unit according to a quadtree structure and/or binary-tree structure. In addition, a reconstructed image signal decoded and output by the decoding device 200 may be reproduced by a reproduction device.

The decoding device 200 may receive a signal output from the encoding device of FIG. 1 in the form of a bitstream and the received signal may be decoded by the entropy decoding unit 210. For example, the entropy decoding unit 210 may derive information (e.g., video/image information) required for image reconstruction (or picture reconstruction) by parsing the bitstream. For example, the entropy decoding unit 210 may decode information in the bitstream based on a coding method such as exponential Golomb coding, CAVLC, or CABAC and output a value of a syntax element required for the image reconstruction and quantized values of transform coefficients for residual. More specifically, in a CABAC entropy decoding method, a bin corresponding to each syntax element is received in the bitstream, a context model is determined by using decoding target syntax element information and decoding information of the neighboring block and the decoding target block or information on a symbol/bin decoded in a previous step, and arithmetic decoding of the bin is performed by predicting a generation probability of the bin according to the determined context model to generate a symbol corresponding to the value of each syntax element. In this case, in a CABAC entropy decoding method, after the context model is determined, the context model may be updated by using the information of the decoded symbol/bin for a context model of a next symbol/bin. Information on prediction among the information decoded by the entropy decoding unit 210 may be provided to the prediction unit (the inter-prediction unit 260 and the intra-prediction unit 265) and a residual value subject to entropy decoding by the entropy decoding unit 210, i.e., the quantized transform coefficients and related parameter information may be input into the dequantization unit 220. Further, the information on the filtering among the information decoded by the entropy decoding unit 210 may be provided to the filtering unit 240. Meanwhile, a receiver (not illustrated) receiving the signal output from the encoding device may be further configured as an internal/external element of the decoding device 200 or the receiver may be a component of the entropy decoding unit 210.

The dequantization unit 220 dequantizes the quantized transform coefficients to output the transform coefficients. The dequantization unit 220 may rearrange the quantized transform coefficients in a 2-dimensional block type. In this case, the rearrangement may be performed based on the coefficient scan order performed by the encoding device. The dequantization unit 220 may dequantize the quantized transform coefficients by using a quantization parameter (e.g., quantization step size information) and obtain the transform coefficients.

The inverse transformation unit 230 inversely transforms the transform coefficients to obtain the residual signal (the residual block or the residual sample array).

The prediction unit may perform prediction for the current block and generate a prediction block including prediction samples for the current block. The prediction unit may determine whether the intra prediction or the inter prediction is applied to the current block based on the information on the prediction output from the entropy decoding unit 210 and determine a specific intra/inter-prediction mode.

The intra-prediction unit 265 may predict the current block by referring to samples in the current picture. The referred samples may be positioned in the neighborhood of the current block or positioned apart from the current block according to the prediction mode. In the intra prediction, the prediction modes may include a plurality of non-directional modes and a plurality of directional modes. The intra-prediction unit 265 may determine the prediction mode applied to the current block by using the prediction mode applied to the neighboring block.

The inter-prediction unit 260 may derive a prediction block for the current block based on a reference block (reference sample array) specified by a motion vector on the reference picture. In this case, in order to reduce an amount of motion information transmitted in the inter-prediction mode, the motion information may be predicted in units of a block, a subblock, or a sample based on a correlation of the motion information between the neighboring block and the current block. The motion information may include a motion vector and a reference picture index. The motion information may further include inter-prediction direction (L0 prediction, L1 prediction, Bi prediction, etc.) information. In the case of the inter prediction, the neighboring block may include a spatial neighboring block which is present in the current picture and a temporal neighboring block which is present in the reference picture. For example, the inter-prediction unit 260 may configure a motion information candidate list based on the neighboring blocks and derive the motion vector and/or the reference picture index of the current block based on received candidate selection information. The inter prediction may be performed based on various prediction modes and the information on the prediction may include information indicating the mode of the inter prediction for the current block.

The addition unit 235 adds the obtained residual signal to a predicted signal (a prediction block or a prediction sample array) output from the inter-prediction unit 260 or the intra-prediction unit 265 to generate a reconstructed signal (a reconstructed picture, a reconstructed block, or a reconstructed sample array). Like the case of applying the skip mode, when there is no residual for the processing target block, the prediction block may be used as the reconstructed block.

The addition unit 235 may be referred to as a reconstruction unit or a reconstructed block generation unit. The generated reconstructed signal may be used for intra prediction of a next processing target block in the current picture and used for inter prediction of a next picture through a filtering as described below.

The filtering unit 240 may enhance a subjective/objective image quality by applying filtering to the reconstructed signal. For example, the filtering unit 240 may generate a modified reconstructed picture by applying various filtering methods to the reconstructed picture and transmit the modified reconstructed picture to the memory 250, specifically, the DPB of the memory 250. The various filtering methods may include, for example, deblocking filtering, a sample adaptive offset, an adaptive loop filter, a bilateral filter, and the like.

The inter-prediction unit 260 may use the (modified) reconstructed picture stored in the DPB of the memory 250 as the reference picture. The memory 250 may store motion information of a block in which the motion information in the current picture is derived (or decoded) and/or motion information of blocks in an already reconstructed picture. The stored motion information may be transferred to the inter-prediction unit 260 so as to be used as the motion information of the spatial neighboring block or the motion information of the temporal neighboring block. The memory 250 may store reconstructed samples of the reconstructed blocks in the current picture and transfer the stored reconstructed samples to the intra-prediction unit 265.

In the present disclosure, the embodiments described in the filtering unit 160, the inter-prediction unit 180, and the intra-prediction unit 185 of the encoding device 100 may be applied to be similar to or correspond even to the filtering unit 240, the inter-prediction unit 260, and the intra-prediction unit 265 of the decoding device 200, respectively.

Block Partitioning

A video/image coding method according to the present disclosure may be performed based on various detailed technologies and respective detailed technologies are schematically described below. It is apparent to those skilled in the art that technologies described below may be associated with related procedures including prediction, residual processing ((inverse) transform, (de)quantization, etc.), syntax element coding, filtering, partitioning/dividing, and the like in a video/image encoding/decoding procedure described above and/or below.

A block partitioning procedure according to the present disclosure is performed by the image partitioning unit 110 of the encoding device described above and partitioning related information may be processed (encoded) by the entropy encoding unit 190 and transferred to the decoding device in the form of a bitstream. The entropy decoding unit 210 of the decoding device may derive a block partitioning structure of the current picture based on the partitioning related information obtained from the bitstream and perform a series of procedures (e.g., prediction, residual processing, block reconstruction, in-loop filtering, etc.) for image decoding based on the derived block partitioning structure.

Partitioning of Picture into CTUs

Pictures may be divided into a sequence of coding tree units (CTUs). The CTU may correspond to a coding tree block (CTB). Alternatively, the CTU may include a coding tree block of luma samples and two coding tree blocks of the corresponding chroma samples. In other words, in respect to a picture including three sample arrays, the CTU may include an N×N block of the luma samples and two corresponding blocks of the chroma samples.

A maximum supported size of the CUT for coding and prediction may be different from a maximum supported size of the CTU for transform. For example, a maximum supported size of the luma block in the CTU may be 128×128.

Partitioning of the CTUs Using a Tree Structure

The CTU may be split into CUs based on a quadtree (QT) structure. The quadtree structure may be referred to as a quaternary tree structure. This is to reflect various local characteristics. Meanwhile, in the present disclosure, the CTU may be split based on multi-type tree structure splitting including binary-tree (BT) and ternary-tree (TT) in addition to quadtree. Hereinafter, a QTBT structure may include quadtree and binary-tree based splitting structures and QTBTTT may include quadtree, binary-tree, and ternary-tree based splitting structures. Alternatively, the QTBT structure may include the quadtree, binary-tree, and ternary-tree based partitioning structures. In the coding tree structure, the CU may have a square or rectangular shape. The CTU may be first split into the quadtree structure. Thereafter, leaf nodes of the quadtree structure may be additionally split by a multi-type tree structure.

FIG. 3 is a diagram illustrating an example of a multi-type tree structure to which the present disclosure may be applied.

In an embodiment of the present disclosure, the multi-type tree structure may include four splitting types illustrated in FIG. 3. The four splitting types may include vertical binary splitting (SPLIT_BT_VER), horizontal binary splitting (SPLIT_BT_HOR), vertical ternary splitting (SPLIT_TT_VER), and horizontal ternary splitting (SPLIT_TT_HOR). The leaf nodes of the multi-type tree structure may be referred to as CUs. The CUs may be used for prediction and transform procedures. In the present disclosure, in general, the CU, the PU, and the TU may have the same block size. However, when a maximum supported transform length is smaller than a width or height of a color component of the CU, the CU and the TU may have different block sizes.

FIG. 4 is a diagram illustrating a signaling mechanism of partition splitting information of a quadtree with nested multi-type tree structure as an embodiment to which the present disclosure may be applied.

Here, the CTU is treated as a root of the quadtree and first partitioned into the quadtree structure. Thereafter, each quadtree leaf node may be further partitioned into the multi-type tree structure. In the multi-type tree structure, a first flag (e.g., mtt_split_cu_flag) is signaled to indicate whether a corresponding node is additionally partitioned. When the corresponding node is additionally partitioned, a second flag (e.g., mtt_split_cu_verticla_flag) may be signaled to indicate a splitting direction. Thereafter, a third flag (e.g., mtt_split_cu_binary_flag) may be signaled to indicate whether a splitting type is binary splitting or ternary splitting. For example, based on the mtt_split_cu_vertical_flag and the mtt_split_cu_binary_flag, a multi-type tree splitting mode MttSplitMode of the CU may be derived as shown in Table 1 below.

TABLE 1

| MttSplitMode | mtt_split_cu_vertical_flag | mtt_split_cu_binary_flag |
|---|---|---|
| SPLIT_TT_HOR | 0 | 0 |
| SPLIT_BT_HOR | 0 | 1 |
| SPLIT_TT_VER | 1 | 0 |
| SPLIT_BT_VER | 1 | 1 |

FIG. 5 is a diagram illustrating a method for splitting a CTU into multiple CUs based on a quadtree and nested multi-type tree structure as an embodiment to which the present disclosure may be applied.

Here, bold block edges indicate quadtree partitioning and the remaining edges indicate multi-type tree partitioning. The quadtree partitioning accompanying the multi-type tree may provide a content-adapted coding tree structure. The CU may correspond to a coding block (CB). Alternatively, the CU may include a coding block of the luma samples and two coding blocks of the corresponding chroma samples. The size of the CU may be as large as the CTU or may be as small as 4×4 in units of the luma sample. For example, in the case of a 4:2:0 color format (or chroma format), a maximum chroma CB size may be 64×64 and a minimum chroma CB size may be 2×2.

In the present disclosure, for example, a maximum supported luma TB size may be 64×64 and a maximum supported chroma TB size may be 32×32. When the width or height of the CB split according to the tree structure is larger than a maximum transform width or height, the corresponding CB may be automatically (or implicitly) split until horizontal and vertical TB size limitations are satisfied.

Meanwhile, for a quadtree coding tree scheme accompanying the multi-type tree, the following parameters may be defined and identified as an SPS syntax element.

CTU size: the root node size of a quaternary tree
MinQTSize: the minimum allowed quaternary tree leaf node size
MaxBtSize: the maximum allowed binary tree root node size
MaxTtSize: the maximum allowed ternary tree root node size
MaxMttDepth: the maximum allowed hierarchy depth of multi-type tree splitting from a quadtree leaf
MinBtSize: the minimum allowed binary tree leaf node size
MinTtSize: the minimum allowed ternary tree leaf node size As an example of the quadtree coding tree structure accompanying the multi-type tree, the CTU size may be configured as 128×128 luma samples and 64×64 blocks of two corresponding chroma samples (in the 4:2:0 chroma format). In this case, MinOTSize may be set to 16×16, MaxBtSize may be set to 128×128, MaxTtSzie may be set to 64×64, MinBtSize and MinTtSize (for both width and height) may be set to 4×4, and MaxMttDepth may be set to 4. The quadtree partitioning may be applied to the CTU and may generate the quadtree leaf nodes. The quadtree leaf node may be referred to as a leaf QT node. The quadtree leaf nodes may have a 128×128 size (i.e., the CTU SIZE) from a 16×16 size (i.e., the MinOTSize). When the leaf QT node is 128×128, the leaf QT node may not be split into the binary tree/ternary tree. The reason is that in this case, even though the leaf QT node is split, the size of the leaf QT node exceeds MaxBtsize and MaxTtszie (i.e., 64×64). In other cases, the leaf QT node may be additionally split into the multi-type tree. Therefore, the leaf QT node may be a root node for the multi-type tree and the leaf QT node may have a multi-type tree depth (mttDepth) value of 0. When the multi-type tree depth reaches MaxMttdepth (e.g., 4), additional splitting may not be considered any longer. When the width of the multi-type tree node is equal to MinBtSize and equal to or smaller than 2×MinTtSize, additional horizontal splitting may not be considered any longer. When the height of the multi-type tree node is equal to MinBtSize and equal to or smaller than 2×MinTtSize, additional vertical splitting may not be considered any longer.

FIG. 6 is a diagram illustrating a method for limiting ternary-tree partitioning as an embodiment to which the present disclosure may be applied.

Referring to FIG. 6, in order to allow 64×64 luma block and 32×32 chroma pipeline design in a hardware decoder, TT splitting may be limited in a specific case. For example, when the width or height of the luma coding block is larger than a predetermined specific value (e.g., 32 or 64), the TT splitting may be limited as illustrated in FIG. 6.

In the present disclosure, the coding tree scheme may support that luma and chroma blocks may separately have the block tree structure. In respect to P and B slices, luma and chroma CTBs in one CTU may be limited to have the same coding tree structure. However, in respect to I slices, the luma and chroma blocks may have separate block tree structures from each other. When the separate block tree modes are applied, the luma CTB may be split into CUs based on a specific coding tree structure and the chroma CTB may be split into chroma CUs based on another coding tree structure. This may mean that the CU in the I slice may be constituted by codling blocks of the luma component and coding blocks of two chroma components and the CU in the P or B slice may be constituted by blocks of three color components.

The quadtree coding tree structure accompanying the multi-type tree in the "Partitioning of the CTUs using a tree structure" is described, but a structure in which the CU is split is not limited thereto. For example, the BT structure and the TT structure may be interpreted as a concept included in a multi partitioning tree (MPT) structure and the CU may be interpreted as being partitioned through the QT structure and the MPT structure. In an example in which the CU is split through the QT structure and the MPT structure, a syntax element (e.g., MPT_split_type) including information on how many blocks the leaf node of the QT structure is split into and a syntax element (e.g., MPT_split_mode) including information on which direction of a vertical direction and a horizontal direction the leaf node of the QT structure is split in are signaled to determine a partitioning structure.

In another example, the CU may be split by a different method from the QT structure, the BT structure, or the TT structure. In other words, unlike a case where the CU of a lower depth is split into ¼ size of the CU of an upper depth according to the QT structure, the CU of the lower depth is split into ½ size of the CU of the upper depth according to the BT structure, or the CU of the lower depth is split into ¼ or ½ size of the CU of the upper depth according to the TT structure, the CU of the lower depth may be split into ⅕, ⅓, ⅜, ⅗, ⅔, or ⅝ size of the CU of the upper depth and the method for splitting the CU is not limited thereto.

If a portion of a tree node block exceeds a bottom or right picture boundary, the corresponding tree node block may be limited so that all samples of all coded CUs are positioned within the picture boundaries. In this case, for example, the following splitting rule may be applied.

If a portion of a tree node block exceeds both the bottom and the right picture boundaries,
If the block is a QT node and the size of the block is larger than the minimum QT size, the block is forced to be split with QT split mode.
Otherwise, the block is forced to be split with SPLIT_BT_HOR mode
Otherwise if a portion of a tree node block exceeds the bottom picture boundaries,
If the block is a QT node, and the size of the block is larger than the minimum QT size, and the size of the block is larger than the maximum BT size, the block is forced to be split with QT split mode.
Otherwise, if the block is a QT node, and the size of the block is larger than the minimum QT size and the size of the block is smaller than or equal to the maximum BT size, the block is forced to be split with QT split mode or SPLIT_BT_HOR mode.
Otherwise (the block is a BTT node or the size of the block is smaller than or equal to the minimum QT size), the block is forced to be split with SPLIT_BT_HOR mode.
Otherwise if a portion of a tree node block exceeds the right picture boundaries,
If the block is a QT node, and the size of the block is larger than the minimum QT size, and the size of the block is larger than the maximum BT size, the block is forced to be split with QT split mode.
Otherwise, if the block is a QT node, and the size of the block is larger than the minimum QT size and the size of the block is smaller than or equal to the maximum BT size, the block is forced to be split with QT split mode or SPLIT_BT_VER mode.
Otherwise (the block is a BTT node or the size of the block is smaller than or equal to the minimum QT size), the block is forced to be split with SPLIT_BT_VER mode.

The quadtree coding block structure accompanying the multi-type tree may provide a very flexible block partitioning structure. Due to spitting types supported to the multi-type tree, different splitting patterns may potentially cause the same coding block structure result in some cases. Generation of the redundant splitting patterns is limited to reduce a data mount of partitioning information. The redundant splitting patterns will be described with reference to following drawings.

FIG. 7 is a diagram illustrating redundant partitioning patterns which may occur in binary-tree partitioning and ternary-tree partitioning as an embodiment to which the present disclosure may be applied.

As illustrated in FIG. 7, two levels of consecutive binary splits in one direction have the same coding block structure as binary splitting for a center partition after the ternary splitting. In such a case, binary tree splitting (in the given direction) for the center partition of the ternary tree splitting may be limited. The limitation may be applied to CUs of all pictures. When specific splitting is limited, signaling of syntax elements may be modified by reflecting such a limitation case and the number of bits signaled for partitioning may be reduced through the modified signaling. For example, like the example illustrated in FIG. 7, when the binary tree splitting for the center partition of the CU is limited, a syntax element mtt_split_cu_binary_flag indicating whether the splitting is the binary splitting or the ternary splitting may not be signaled and the value may be inferred as 0 by the decoder.

Prediction

In order to reconstruct a current processing unit in which decoding is performed, decoded parts of a current picture or other pictures including the current processing unit may be used.

A picture using only the current picture for reconstruction, i.e., performing the intra prediction may be referred to as an intra picture or an I picture (slice), a picture (slice) using up to one motion vector and reference index in order to predict each unit may be referred to as a predictive picture or P picture (slice), and a picture (slice) using up to two motion vectors and reference indexes may be referred to as a bi-predictive picture or B picture (slice).

The intra prediction means a prediction method that derives a current processing block from a data element (e.g., a sample value, etc.) of the same decoded picture (or slice). In other words, the intra prediction means a method for predicting a pixel value of the current processing block by referring to reconstructed areas in the current picture.

Hereinafter, the inter prediction will be described in more detail.

Inter Prediction (or Inter-Picture Prediction)

The inter prediction means a prediction method of deriving the current processing block based on data elements (e.g., the sample value or motion vector) of pictures other than the current picture. In other words, the intra prediction means a method for predicting a pixel value of the current processing block by referring to reconstructed areas in other reconstructed pictures other than the current picture.

The inter prediction (inter-picture prediction) as a technique for eliminating redundancy existing between pictures is mostly performed by motion estimation and motion compensation.

In the present disclosure, a detailed description of the inter prediction method described in FIGS. 1 and 2 above is made and the decoder may be represented as an inter prediction based video/image decoding method of FIG. 10 and an inter-prediction unit in the decoding device of FIG. 11 to be described below. Moreover, the encoder may be represented as an inter prediction based video/image encoding method of FIG. 8 and the inter-prediction unit in the encoding device of FIG. 9 to be described below. In addition, encoded data by FIGS. 8 and 9 may be stored in the form of a bitstream.

The prediction unit of the encoding device/decoding device may derive the prediction sample by performing the inter prediction in units of the block. The inter prediction may represent prediction derived by a method dependent to the data elements (e.g., sample values or motion information) of a picture(s) other than the current picture. When the inter prediction is applied to the current block, a prediction block (prediction sample array) for the current block may be derived based on a reference block (reference sample array) specified by the motion vector on the reference picture indicated by the reference picture index.

In this case, in order to reduce an amount of motion information transmitted in the inter-prediction mode, the motion information of the current block may be predicted in units of a block, a subblock, or a sample based on a correlation of the motion information between the neighboring block and the current block. The motion information may include the motion vector and the reference picture index. The motion information may further include inter-prediction type (L0 prediction, L1 prediction, Bi prediction, etc.) information.

In the case of applying the inter prediction, the neighboring block may include a spatial neighboring block which is present in the current picture and a temporal neighboring block which is present in the reference picture. A reference picture including the reference block and a reference picture including the temporal neighboring block may be the same as each other or different from each other. The temporal neighboring block may be referred to as a name such as a collocated reference block, a collocated CU (colCU), etc., and the reference picture including the temporal neighboring block may be referred to as a collocated picture (colPic). For example, a motion information candidate list may be configured based on the neighboring blocks of the current block and a flag or index information indicating which candidate is selected (used) may be signaled in order to derive the motion vector and/or reference picture index of the current block.

The inter prediction may be performed based on various prediction modes and for example, in the case of a skip mode and a merge mode, the motion information of the current block may be the same as the motion information of the selected neighboring block. In the case of the skip mode, the residual signal may not be transmitted unlike the merge mode. In the case of a motion vector prediction (MVP) mode, the motion vector of the selected neighboring block may be used as a motion vector predictor and a motion vector difference may be signaled. In this case, the motion vector of the current block may be derived by using a sum of the motion vector predictor and the motion vector difference.

FIGS. 8 and 9 are diagrams illustrating an inter prediction based video/image encoding method according to an embodiment of the present disclosure and an inter prediction unit in an encoding device according to an embodiment of the present disclosure.

Referring to FIGS. 8 and 9, S801 may be performed by the inter-prediction unit 180 of the encoding device and S802 may be performed by the residual processing unit of the encoding device. Specifically, S802 may be performed the subtraction unit 115 of the encoding device. In S803, prediction information may be derived by the inter-prediction unit 180 and encoded by the entropy encoding unit 190. In S803, residual information may be derived by the residual processing unit and encoded by the entropy encoding unit 190. The residual information is information on the residual samples. The residual information may include information on quantized transform coefficients for the residual samples.

As described above, the residual samples may be derived as transform coefficients by the transformation unit 120 of the encoding device and the transform coefficients may be derived as quantized transform coefficients by the quantization unit 130. Information on the quantized transform coefficients may be encoded through a residual coding procedure by the entropy encoding unit 190.

The encoding device performs inter prediction for the current block (S801). The encoding device may derive the inter prediction mode and the motion information of the current block and generate prediction samples of the current block. Here, an inter prediction mode determining procedure, a motion information deriving procedure, and a generation procedure of the prediction samples may be simultaneously performed and any one procedure may be performed earlier than other procedures. For example, the inter-prediction unit 180 of the encoding device may include a prediction mode determination unit 181, a motion information derivation unit 182, and a prediction sample derivation unit 183, and the prediction mode determination unit 181 may determine the prediction mode for the current block, the motion information derivation unit 182 may derive the motion information of the current block, and the prediction sample derivation unit 183 may derive motion samples of the current block.

For example, the inter-prediction unit 180 of the encoding device may search a block similar to the current block in a predetermined area (search area) of reference pictures through motion estimation and derive a reference block in which a difference from the current block is minimum or is equal to or less than a predetermined criterion. A reference picture index indicating a reference picture at which the reference block is positioned may be derived based thereon and a motion vector may be derived based on a difference in location between the reference block and the current block. The encoding device may determine a mode applied to the current block among various prediction modes. The encoding device may compare RD cost for the various prediction modes and determine an optimal prediction mode for the current block.

For example, when the skip mode or the merge mode is applied to the current block, the encoding device may configure a merge candidate list to be described below and derive a reference block in which a difference from the current block is minimum or is equal to or less than a predetermined criterion among reference blocks indicated by merge candidates included in the merge candidate list. In this case, a merge candidate associated with the derived reference block may be selected and merge index information indicating the selected merge candidate may be generated and signaled to the decoding device. The motion information of the current block may be derived by using the motion information of the selected merge candidate.

As another example, when an (A)MVP mode is applied to the current block, the encoding device may configure an (A)MVP candidate list to be described below and use a motion vector of a selected mvp candidate among motion vector predictor (mvp) candidates included in the (A)MVP candidate list as the mvp of the current block. In this case, for example, the motion vector indicating the reference block derived by the motion estimation may be used as the motion vector of the current block and an mvp candidate having a motion vector with a smallest difference from the motion vector of the current block among the mvp candidates may become the selected mvp candidate. A motion vector difference (MVD) which is a difference obtained by subtracting the mvp from the motion vector of the current block may be derived. In this case, the information on the MVD may be signaled to the decoding device. Further, when the (A)MVP mode is applied, the value of the reference picture index may be configured as reference picture index information and separately signaled to the decoding device.

The encoding device may derive the residual samples based on the prediction samples (S802). The encoding device may derive the residual samples by comparing original samples of the current block and the prediction samples.

The encoding device encodes image information including prediction information and residual information (S803). The encoding device may output the encoded image information in the form of a bitstream. The prediction information may include information on prediction mode information (e.g., skip flag, merge flag or mode index, etc.) and information on motion information as information related to the prediction procedure. The information on the motion information may include candidate selection information (e.g., merge index, mvp flag or mvp index) which is information for deriving the motion vector. Further, the information on the motion information may include the information on the MVD and/or the reference picture index information.

Further, the information on the motion information may include information indicating whether to apply L0 prediction, L1 prediction, or bi-prediction. The residual information is information on the residual samples. The residual information may include information on quantized transform coefficients for the residual samples.

An output bitstream may be stored in a (digital) storage medium and transferred to the decoding device or transferred to the decoding device via the network.

Meanwhile, as described above, the encoding device may generate a reconstructed picture (including reconstructed samples and reconstructed blocks) based on the reference samples and the residual samples. This is to derive the same prediction result as that performed by the decoding device, and as a result, coding efficiency may be increased. Accordingly, the encoding device may store the reconstructed picture (or reconstructed samples or reconstructed blocks) in the memory and utilize the reconstructed picture as the reference picture. The in-loop filtering procedure may be further applied to the reconstructed picture as described above.

FIGS. 10 and 11 are diagrams illustrating an inter prediction based video/image decoding method according to an embodiment of the present disclosure and an inter prediction unit in a decoding device according to an embodiment of the present disclosure.

Referring to FIGS. 10 and 11, the decoding device may perform an operation corresponding to the operation performed by the encoding device. The decoding device may perform the prediction for the current block based on received prediction information and derive the prediction samples.

S1001 to S1003 may be performed by the inter-prediction unit 260 of the decoding device and the residual information of S1004 may be obtained from the bitstream by the entropy decoding unit 210 of the decoding device. The residual processing unit of the decoding device may derive the residual samples for the current block based on the residual information. Specifically, the dequantization unit 220 of the residual processing unit may derive transform coefficients by performing dequantization based on quantized transform coefficients derived based on the residual information and the inverse transformation unit 230 of the residual processing unit may derive the residual samples for the current block by performing inverse transform for the transform coefficients. S1005 may be performed by the addition unit 235 or the reconstruction unit of the decoding device.

Specifically, the decoding device may determine the prediction mode for the current block based on the received prediction information (S1001). The decoding device may determine which inter prediction mode is applied to the current block based on the prediction mode information in the prediction information.

For example, it may be determined whether the merge mode or the (A)MVP mode is applied to the current block based on the merge flag. Alternatively, one of various inter prediction mode candidates may be selected based on the mode index. The inter prediction mode candidates may include a skip mode, a merge mode, and/or an (A)MVP mode or may include various inter prediction modes to be described below.

The decoding device derives the motion information of the current block based on the determined inter prediction mode (S1002). For example, when the skip mode or the merge mode is applied to the current block, the decoding device may configure the merge candidate list to be described below and select one merge candidate among the merge candidates included in the merge candidate list. The selection may be performed based on the selection information (merge index). The motion information of the current block may be derived by using the motion information of the selected merge candidate. The motion information of the selected merge candidate may be used as the motion information of the current block.

As another example, when an (A)MVP mode is applied to the current block, the decoding device may configure an (A)MVP candidate list to be described below and use a motion vector of a selected mvp candidate among motion vector predictor (mvp) candidates included in the (A)MVP candidate list as the mvp of the current block. The selection may be performed based on the selection information (mvp flag or mvp index). In this case, the MVC of the current block may be derived based on the information on the MVD, and the motion vector of the current block may be derived based on the mvp of the current block and the MVD. Further, the reference picture index of the current block may be derived based on the reference picture index information. The picture indicated by the reference picture index in the reference picture list for the current block may be derived as the reference picture referred for the inter prediction of the current block.

Meanwhile, the motion information of the current block may be derived without a candidate list configuration as described below and in this case, the motion information of the current block may be derived according to a procedure disclosed in the prediction mode to be described below. In this case, the candidate list configuration may be omitted.

The decoding device may generate the prediction samples for the current block based on the motion information of the current block (S1003). In this case, the reference picture may be derived based on the reference picture index of the current block and the prediction samples of the current block may be derived by using the samples of the reference block indicated by the motion vector of the current block on the reference picture. In this case, as described below, in some cases, a prediction sample filtering procedure for all or some of the prediction samples of the current block may be further performed.

For example, the inter-prediction unit 260 of the decoding device may include a prediction mode determination unit 261, a motion information derivation unit 262, and a prediction sample derivation unit 263, and the prediction mode determination unit 261 may determine the prediction mode for the current block based on the received prediction mode information, the motion information derivation unit 262 may derive the motion information (the motion vector and/or reference picture index) of the current block based on the information on the received motion information, and the prediction sample derivation unit 263 may derive the prediction samples of the current block.

The decoding device generates the residual samples for the current block based on the received residual information (S1004). The decoding device may generate the reconstructed samples for the current block based on the prediction samples and the residual samples and generate the reconstructed picture based on the generated reconstructed samples (S1005). Thereafter, the in-loop filtering procedure may be further applied to the reconstructed picture as described above.

As described above, the inter prediction procedure may include an inter prediction mode determining step, a motion information deriving step depending on the determined prediction mode, and a prediction performing (prediction sample generating) step based on the derived motion information.

Determination of Inter Prediction Mode

Various inter prediction modes may be used for predicting the current block in the picture. For example, various modes including a merge mode, a skip mode, an MVP mode, an affine mode, and the like may be used. A decoder side motion vector refinement (DMVR) mode, an adaptive motion vector resolution (AMVR) mode, etc., may be further used as an ancillary mode. The affine mode may be referred to as an affine motion prediction mode. The MVP mode may be referred to as an advanced motion vector prediction (AMVP) mode.

The prediction mode information indicating the inter prediction mode of the current block may be signaled from the encoding device to the decoding device. The prediction mode information may be included in the bitstream and received by the decoding device. The prediction mode information may include index information indicating one of multiple candidate modes. Alternatively, the inter prediction mode may be indicated through a hierarchical signaling of flag information. In this case, the prediction mode information may include one or more flags.

For example, whether to apply the skip mode may be indicated by signaling a skip flag, whether to apply the merge mode may be indicated by signaling a merge flag when the skip mode is not applied, and it is indicated that the MVP mode is applied or a flag for additional distinguishing may be further signaled when the merge mode is not applied. The affine mode may be signaled as an independent mode or signaled as a dependent mode on the merge mode or the MVP mode. For example, the affine mode may be configured as one candidate of the merge candidate list or MVP candidate list as described below.

Derivation of Motion Information According to Inter Prediction Mode

The inter prediction may be performed by using the motion information of the current block. The encoding device may derive optimal motion information for the current block through a motion estimation procedure. For example, the encoding device may search a similar reference block having a high correlation in units of a fractional pixel within a predetermined search range in the reference picture by using an original block in an original picture for the current block and derive the motion information through the searched reference block. The similarity of the block may be derived based on a difference of phase based sample values. For example, the similarity of the block may be calculated based on an SAD between the current block (or a template of the current block) and the reference block (or the template of the reference block). In this case, the motion information may be derived based on a reference block having a smallest SAD in a search area. The derived motion information may be signaled to the decoding device according to various methods based on the inter prediction mode.

Merge Mode and Skip Mode

FIG. 12 is a diagram for describing a neighboring block used in a merge mode or a skip mode as an embodiment to which the present disclosure is applied.

When the merge mode is applied, the motion information of the current prediction block is not directly transmitted and the motion information of the current prediction block is derived by using the motion information of a neighboring prediction block. Accordingly, flag information indicating that the merge mode is used and a merge index indicating which neighboring prediction block is used are transmitted to indicate the motion information of the current prediction block.

The encoder may search a merge candidate block used for deriving the motion information of the current prediction block in order to perform the merge mode. For example, up to five merge candidate blocks may be used, but the present disclosure is not limited thereto. In addition, the maximum number of merge candidate blocks may be transmitted in a slider header (or tile group header) and the present disclosure is not limited thereto. After finding the merge candidate blocks, the encoder may generate the merge candidate list and selects a merge candidate block having the smallest cost among the merge candidate blocks as a final merge candidate block.

The present disclosure provides various embodiments for the merge candidate block constituting the merge candidate list.

As the merge candidate list, for example, five merge candidate blocks may be used. For example, four spatial merge candidates and one temporal merge candidate may be used. As a specific example, in the case of the spatial merge candidate, the blocks illustrated in FIG. 12 may be used as the spatial merge candidate.

FIG. 13 is a flowchart illustrating a method for configuring a merge candidate list according to an embodiment to which the present disclosure is applied.

Referring to FIG. 13, a coding device (encoder/decoder) inserts the spatial merge candidates derived by searching the spatial neighboring blocks of the current block into the merge candidate list (S1301). For example, the spatial neighboring blocks may include a bottom left corner neighboring block, a left neighboring bock, a top right corner neighboring block, a top neighboring block, and a top left corner neighboring block of the current block. However, this is an example and additional neighboring blocks including a right neighboring block, a bottom neighboring block, a bottom right neighboring block, and the like may be further used as the spatial neighboring blocks in addition to the spatial neighboring blocks. The coding device may derive available blocks by searching the spatial neighboring blocks based on a priority and derive the motion information of the detected blocks as the spatial merge candidates. For example, the encoder and decoder may search five blocks illustrated in FIG. 12 in the order of A1, B1, B0, A0, and B2 and sequentially index the available candidates and configure the indexed candidates as the merge candidate list.

The coding device inserts the temporal merge candidate derived by searching the temporal neighboring block of the current block into the merge candidate list (S1302). The temporal neighboring block may be positioned on the reference picture which is a different picture from the current picture at which the current block is positioned. The reference picture at which the temporal neighboring block is positioned may be referred to as a collocated picture or a col picture. The temporal neighboring block may be searched in the order of a bottom right corner neighboring block and a bottom right center block of a co-located block for the current block on the col picture.

Meanwhile, when motion data compression is applied, specific motion information may be stored as representative motion information in the col picture for each predetermined storage unit. In this case, motion information for all blocks in the predetermined storage unit need not be stored, and as a result, a motion data compression effect may be obtained. In this case, the predetermined storage unit may be predetermined for each 16×16 sample unit or 8×8 sample unit or size information for the predetermined storage unit may be signaled from the encoder to the decoder. When the motion data compression is applied, the motion information of the temporal neighboring block may be replaced with the representative motion information of the predetermined storage unit at which the temporal neighboring block is positioned.

In other words, in this case, in terms of implementation, the temporal merge candidate may be derived based on motion information of a prediction block covering a location subject to arithmetic right shift and then arithmetic left shift by a predetermined value based on a coordinate (top left sample position) of the temporal neighboring block other than a prediction block positioned on the coordinate of the temporal neighboring block. For example, when the predetermined storage unit is a 2n×2n sample unit, if the coordinate of the temporal neighboring block is (xTnb, yTnb), motion information of a prediction block positioned at ((xTnb>>n)<<n), (yTnb>>n)<<n)) which is a modified location may be used for the temporal merge candidate.

Specifically, for example, when the predetermined storage unit is a 16×16 sample unit, if the coordinate of the temporal neighboring block is (xTnb, yTnb), motion information of a prediction block positioned at ((xTnb>>4)<<4), (yTnb>>4)<<4)) which is a modified location may be used for the temporal merge candidate. Alternatively, for example, when the predetermined storage unit is an 8×8 sample unit, if the coordinate of the temporal neighboring block is (xTnb, yTnb), motion information of a prediction block positioned at ((xTnb>>3)<<3), (yTnb>>3)<<3)) which is a modified location may be used for the temporal merge candidate.

The coding device may check whether the current number of merge candidates is smaller than the maximum number of merge candidates (S1303). The maximum number of merge candidates may be predefined or signaled from the encoder to the decoder. For example, the encoder may generate information on the maximum number of merge candidates and encode the generated information and transfer the encoded information to the decoder in the form of a bitstream. When the maximum number of merge candidates is completely filled, a subsequent candidate addition process may not be performed.

As the checking result, when the current number of merge candidates is smaller than the maximum number of merge candidates, the coding device inserts additional merge candidates into the merge candidate list (S1304). The additional merge candidates may include, for example, ATMVP, a combined bi-predictive merge candidate (when a slice type of current slice is type B) and/or a zero-vector merge candidate.

As the checking result, when the current number of merge candidates is not smaller than the maximum number of merge candidates, the coding device may terminate the configuration of the merge candidate list. In this case, the encoder may select an optimal merge candidate among the merge candidates constituting the merge candidate list based on rate-distortion (RD) cost and signal selection information (e.g., merge index) indicating the selected merge candidate to the decoder. The decoder may select the optimal merge candidate based on the merge candidate list and the selection information.

The motion information of the selected merge candidate may be used as the motion information of the current block and the prediction samples of the current block may be derived based on the motion information of the current block as described above. The encoder may derive the residual samples of the current block based on the prediction samples and signal the residual information for the residual samples to the decoder. The decoder may generate the reconstructed samples based on the residual samples derived based on the residual information and the prediction samples and generate the reconstructed picture based on the generated reconstructed samples as described above.

When the skip mode is applied, the motion information of the current block may be derived by the same method as the case where the merge mode is applied as above. However, when the skip mode is applied, a residual signal for the corresponding block is omitted, and as a result, the prediction samples may be directly used as the reconstructed samples.

MVP Mode

FIG. 14 is a flowchart illustrating a method for configuring a merge candidate list according to an embodiment to which the present disclosure is applied.

When the motion vector prediction (MVP) mode is applied, a motion vector predictor (mvp) candidate list may be generated by using the motion vector of the reconstructed spatial neighboring block (e.g., may be the neighboring block described in FIG. 12 above) and/or the motion vector corresponding to the temporal neighboring block (or Col block). In other words, the motion vector of the reconstructed spatial neighboring block and/or the motion vector corresponding to the temporal neighboring block may be used as the motion vector predictor candidate.

The information on the prediction may include selection information (e.g., an MVP flag or MVP index) indicating an optimal motion vector predictor candidate selected among the motion vector predictor candidates included in the list. In this case, the prediction unit may select the motion vector predictor of the current block among the motion vector predictor candidates included in the motion vector candidate list by using the selected information. The prediction unit of the encoding device may obtain a motion vector difference (MVD) between the motion vector and the motion vector predictor of the current block and encode the obtained MVD and output the encoded MVD in the form of a bitstream. In other words, the MVD may be obtained by a value obtained by subtracting the motion vector predictor from the motion vector of the current block. In this case, the prediction unit of the decoding device may obtain the motion vector difference included in the information on the prediction and derive the motion vector of the current block by adding the motion vector difference and the motion vector predictor. The prediction unit of the decoding device may obtain or derive the reference picture index indicating the reference picture from the information on the prediction. For example, the motion vector predictor candidate list may be configured as illustrated in FIG. 14.

Advanced Temporal Motion Vector Prediction (ATMVP)

FIGS. 15 and 16 are diagrams for describing a method for deriving an Advanced Temporal Motion Vector Prediction (ATMVP) candidate as an embodiment to which the present disclosure is applied.

Referring to FIG. 15, the ATMVP is a method for deriving the motion information for subblocks of the coding unit based on motion information of collocated blocks of a temporally neighboring picture. Therefore, the performance of a temporal motion vector prediction (TMVP) may be enhanced and general or worst-case complexity may be reduced. In the present disclosure, the ATMVP may be referred to as a subblock-based temporal merge candidate, SbTMVP.

According to an embodiment of the present disclosure, the ATMVP may be derived by the following process.

First, when the neighboring coding unit is available and the motion vector of the available coding unit is different from the motion vector in the current candidate list, the encoder/decoder may add the motion vector from the spatial neighboring coding units. As one example, referring to FIG. 16, the process may be performed in the order of A1, B1, B0, A0, and B2. As another example, for improvement of the complexity, in the process, the ATMVP may be derived by using only a motion vector of a block at a fixed location (e.g., A1 location).

The encoder/decoder may use a first motion vector candidate among No available spatial candidates in order to determine a location to derive the collocated picture and the motion information of each subblock. Here, No represents the number of available spatial candidates. If No is 0, the collocated picture and a collocated position having a motion of 0 may be used for deriving the motion information of each subblock.

When multiple reference pictures are used, collocated pictures of different coding units may not be the same as each other in the ATMVP. A fact that different coding units in the current picture have different collocated pictures for deriving the ATMVP means that motion information fields of multiple reference pictures should be derived and this is not preferable because this increases a memory bandwidth.

Accordingly, the present disclosure provides a simpler design of using the same collocated picture when deriving the ATMVP. For example, a method that uses the same collocated picture may be defined in a slice (or tile group) header, but the present disclosure is not limited thereto. As one example, at a block level, when the reference picture of neighboring block A is different from the collocated picture, the motion vector of neighboring block A may be scaled based on a temporal motion vector scaling method. In addition, the scaled motion vector of neighboring block A may be used in the ATMVP.

FIG. 17 is a diagram for describing a method for deriving an Advanced Temporal Motion Vector Prediction (ATMVP) candidate as an embodiment to which the present disclosure is applied.

Referring to FIG. 17, in an embodiment of the present disclosure, since TMVP using the motion vector of the right-bottom block of the current block or a temporal neighboring block (or colPB) at the center location of the current block does not reflect an intra-picture motion, the encoder/decoder may use the motion vector of the colPB at a location indicated by the neighboring block of the neighboring block as the MVP.

For example, the encoder/decoder may find the motion vector of a first available spatial neighboring block while checking the blocks like the merge candidate configuration order illustrated in FIG. 17. In addition, a location indicated by the motion vector in the reference picture may be derived as col-PB (i.e., ATMVP candidate).

Further, the motion vector may be used as the motion vector of a corresponding block in units of each subblock. In this case, when there is no motion vector in a specific subblock, the motion vector of a center block positioned at the center of the corresponding block may be used as the motion vector for an unavailable subblock and stored as a representative motion vector.

Temporal Motion Vector Data Storage Reduction

An embodiment of the present disclosure proposes a method for reducing a temporal motion vector storage based on motion vector data of spatial candidates for compression of temporal motion vector data.

FIGS. 18 and 19 are diagrams illustrating a method for compressing temporal motion vector data and locations of spatial candidates used therefor according to an embodiment of the present disclosure.

Referring to FIG. 18, in an embodiment of the present disclosure, when the spatial candidate is predicted by the inter prediction, the motion vector of the spatial candidate may be configured as a default motion vector for compression. For example, a maximum of five spatial candidates may be used as reference time motion information for deriving a default temporal motion vector. As an embodiment, the five spatial candidates may be configured as illustrated in FIG. 19.

Further, the temporal motion vector data may be compressed based on the motion vectors of the spatial candidates. An order of searching the spatial candidate may be illustrated in FIG. 18. The spatial candidates may be confirmed according to the order of a center block C, a top left block TL, a top right block TR, a bottom left block BL, and a bottom right block BR. This is just an embodiment and the present disclosure is not limited thereto and other combinable orders may be applied.

First, the encoder/decoder may check whether the center block C is inter-predicted. If the center block C is inter-predicted, the encoder/decoder may configure the motion vector of the center block C as a default for predicting the motion vector.

If the center block C is not inter-predicted, the encoder/decoder may check whether the top left block TL is inter-predicted. If the top left block TL is inter-predicted, the encoder/decoder may configure the motion vector of the top left block TL as the default for predicting the motion vector.

If the top left block TL is not inter-predicted, the encoder/decoder may check whether the top right block TR is inter-predicted. If the top right block TR is inter-predicted, the encoder/decoder may configure the motion vector of the top right block TR as the default for predicting the motion vector.

If the top right block TR is not inter-predicted, the encoder/decoder may check whether the bottom left block BL is inter-predicted. If the bottom left block BL is inter-predicted, the encoder/decoder may configure the motion vector of the bottom left block BL as the default for predicting the motion vector.

If the bottom left block BL is not inter-predicted, the encoder/decoder may check whether the bottom right block BR is inter-predicted.

If the bottom right block BR is inter-predicted, the encoder/decoder may configure the motion vector of the bottom right block BR as the default for predicting the motion vector.

If the bottom right block BR is not inter-predicted, the encoder/decoder may configure the intra mode as the default.

Through such a process, the encoder/decoder compresses a default motion vector into motion information.

Embodiment of Performing ATMVP Based on Adaptive Subblock Size

An embodiment of the present disclosure proposes a method for performing ATMVP based on an adaptive subblock size. For example, a subblock size used for deriving the ATMVP may be adaptively applied at a slice level.

Meanwhile, if ATMVP motion information is derived in units of 4×4 blocks, there may be a problem in that motion derivation and motion compensation are performed every 4×4 subblocks in one ATMVP coding unit.

In order to solve the problem, the encoder may signal to the decoder one default subblock size used for ATMVP motion derivation at a sequence level.

As another example, when the default subblock size is used in a current slice, a flag may be signaled at a picture or slice level. If the flag is false, the ATMVP subblock size may be additionally signaled in a slice header.

Embodiment of Limiting Area for Deriving Collocated Block

In the present disclosure, an area of a collocated block for the ATMVP may include an N×N block of one column in a current CTU and a collocated picture. For example, the N×N block may be the 4×4 block, but the present disclosure is not limited thereto.

An ATMVP collocated block identified by the motion vector of the merge candidate is positioned outside the limited area, the ATMVP collocated block may move to be positioned in the limited area. For example, the ATMVP collocated block may move to be positioned on a closest boundary in the limited area.

Embodiment of Deriving Subblock-Based Temporal Merge Candidate

In an embodiment of the present disclosure, the encoder/decoder may add, to a subblock merge candidate list, motion information of a collocated block (or collocated subblock in a collocated picture specified based on motion information of a spatially neighboring block as a subblock-based temporal merge candidate.

In the present disclosure, the motion information of the spatially neighboring block may be referred to as the temporal motion vector. As the embodiment, when a width and a height of a current coding block are equal to or larger than predetermined specific sizes, the encoder/decoder may derive the subblock-based temporal merge candidate. For example, the predetermined specific sizes may be 8.

As the embodiment, the encoder/decoder may configure motion information of a first spatial candidate among available spatial candidates as the time motion vector. As an example, the encoder/decoder may search the available spatial candidates in the order of A1, B1, B0, and A0. In this case, the encoder/decoder may configure a spatial candidate in which the reference picture is the same as the collocated picture among the available spatial candidates as the time motion vector. As another example, the encoder/decoder may check whether one fixed-location spatial candidate is available and when the fixed location spatial candidate is available, the encoder/decoder may configure the motion vector of the corresponding spatial candidate as the temporal motion vector. For example, the one fixed-location spatial candidate may be configured as a block of location A1.

Further, the encoder/decoder may specify the location of the collocated block in the collocated picture by using the temporal motion vector. As an example, Equation 1 described above may be used.

$$xColCb = \text{Clip3}(xCtb, \text{Min}(\text{CurPicWidthInSamples}Y-1, xCtb+(1<<Ctb \ \text{Log} \ 2SizeY)+3), xColCtrCb+(tempMv[0]>>4))$$

$$yColCb = \text{Clip3}(yCtb, \text{Min}(\text{CurPicHeightInSamples}Y-1, yCtb+(1<<Ctb \ \text{Log} \ 2SizeY)-1), yColCtrCb+(tempMv[1]>4))$$ [Equation 1]

Here, (xColCtrCb, yColCtrCb) represents a top-left sample location of a collocated coding block including a top-right sample of a center location and tempMv represents the temporal motion vector.

Further, the encoder/decoder may determine a location to derive the motion information of each subblock in the current coding block in units of subblocks. In an embodiment, the location of the collocated subblock in the collocated picture may be derived by using Equation 2 below.

$$xColSb = \text{Clip3}(xCtb, \text{Min}(\text{CurPicWidthInSamples}Y-1, xCtb+(1<<Ctb \ \text{Log} \ 2SizeY)+3), xSb+(tempMv[0]>>4))$$

$$yColSb = \text{Clip3}(yCtb, \text{Min}(\text{CurPicHeightInSamples}Y-1, yCtb+(1<<Ctb \ \text{Log} \ 2SizeY)-1), ySb+(tempMv[1]>>4))$$ [Equation 2]

Here, (xSb, ySb) represents the location of a current subblock.

In an embodiment, when the current collocated subblock is not available, the encoder/decoder may use the motion information of the collocated block specified by the temporal motion vector.

FIG. 20 is a flowchart showing a method for generating an inter prediction block based on a candidate list according to an embodiment to which the present disclosure is applied.

Referring to FIG. 20, an inter-prediction process performed by the inter-prediction units 180 and 260 described in FIGS. 1 and 2 above is illustrated. In FIG. 20, it is assumed that as a method for performing the prediction by deriving predicted motion information (PMI) predicted through the inter prediction, a merge mode and an inter mode (i.e., (A)MVP mode) are used. However, the present disclosure is not limited thereto and various other modes may be applied for the inter prediction.

As described above, the merge mode and the inter mode may be classified according to whether at least one of a motion vector difference (MVD), a reference list (or reference picture list), and/or a reference picture index is transmitted through the bitstream in addition to a candidate index in order to derive final PMI used for generating the prediction block.

Specifically, the encoder/decoder checks whether the merge mode is applied to the current block (S2001).

If the merge mode is applied to the current block, the encoder/decoder generates the merge candidate (or merge candidate list) and selects PMI used for the inter prediction of the current block (S2002 and S2003). When the merge mode is applied, the encoder may transmit to the decoder the selected PMI information as a merge index. The merge index may indicate a specific merge candidate among the merge candidates. The encoder/decoder may use motion information of the specific merge candidate as a motion vector for the inter prediction of the current block.

If the merge is not applied to the current block (that is, if the inter mode is applied), the encoder/decoder generates an inter candidate (or inter candidate list) and selects initial PMI (or motion vector predictor) used for the inter prediction of the current block (S2004 and S2005). When the inter mode is applied, the encoder may transmit to the decoder the selected PMI information as a motion vector predictor flag (or index). The motion vector predictor flag may indicate a specific inter candidate among the inter candidates. In addition, the inter candidate may be referred to a motion vector predictor candidate. The encoder/decoder adds a motion vector difference to the initial PMI to derive a motion vector used for a prediction (S2006).

The encoder/decoder generates the prediction block of the current block by using the derived motion vector (S2007).

In other words, when the merge mode is applied, the encoder/decoder does not use an additional syntax (or syntax element) in addition to a signaling of a candidate index (i.e., merge index) in order to derive the final PMI and generates the prediction block of the current block by using motion information of a candidate selected through the candidate index. In this case, a candidate generation process is performed in step S2002 (or block).

Even when the inter mode is applied, the candidate generation process is performed in step S2004 in a similar method to the merge mode. When the inter mode is applied, the encoder/decoder derives the final PMI by receiving additional motion information based on the motion information of the selected candidate and generates the prediction block of the current block by using the derived final PMI.

Hereinafter, a method for generating a candidate (or candidate list) by using motion information of the neighboring block will be described.

FIG. 21 is a flowchart illustrating a method for generating a candidate list according to an embodiment to which the present disclosure is applied.

Referring to FIG. 21, the decoder is mainly described for convenience of description, but the candidate list generating method of the embodiment may be equally performed even in the encoder. In an embodiment, the methods described in FIGS. 12 to 17 may be applied and duplicated descriptions thereof will be omitted.

A candidate configuration order illustrated in FIG. 21 is one example and the present disclosure is not limited thereto and the order may be changed or some steps may be omitted or added. Further, candidates added in FIG. 21 are examples and various other candidates may be added and some candidates among the candidates illustrated in FIG. 21 may not be used.

The decoder adds a spatial neighboring block (or spatial candidate) to a candidate list (S2101). For example, the decoder may add to the candidate list the neighboring candidate blocks of FIG. 16 described above.

The decoder adds a temporal neighboring block (or temporal candidate) to the candidate list (S2102).

The decoder adds combined motion information (or combined motion vector) to the candidate list and adds a zero motion vector to the candidate list (S2103 and S2104).

FIG. 22 illustrates one example of a neighboring block used for an inter prediction according to an embodiment to which the present disclosure is applied.

Referring to FIG. 22, the encoder/decoder may construct the candidate list by using motion information of the spatial neighboring block based on a spatial similarity and motion information of the temporal neighboring block based on a temporal similarity. In the present disclosure, the motion information of the spatial neighboring block may be referred to as spatial neighboring information and the motion information of the temporal neighboring block may be referred to as corresponded temporal information.

As the embodiment, the encoder/decoder may construct the candidate list by using the spatial candidate (or spatial neighboring information) illustrated in FIG. 22. In addition, the encoder/decoder may construct the candidate list by using the temporal candidate (or corresponded temporal information) illustrated in FIG. 22.

As described above, an Adaptive Temporal Motion Vector Prediction (ATMVP) may be used in order to correct temporal similarity information considering the spatial similarity. The ATMVP is a method for deriving motion information for the subblocks based on motion information of a collocated block of a temporally neighboring picture. Through the method, the performance of a Temporal Motion Vector Prediction (TMVP) may be enhanced and a complexity may be improved. In the present disclosure, the ATMVP may be referred to as a subblock-based temporal merge candidate, SbTMVP, etc.

In other words, since the TMVP using the motion vector of the collocated block at a right-bottom or center location of the current block does not reflect a motion in the picture, the TMVP may use the motion vector of a collocated block at a location indicated by the motion vector of the neighboring block as the motion vector prediction.

Referring back to FIG. 17 described above, in an embodiment, the encoder/decoder may find the motion vector of a first available spatial neighboring block while checking the blocks in a predetermined merge candidate configuration order. Thereafter, the encoder/decoder may determine a location indicated by the corresponding motion vector (i.e., temporal motion vector) in the reference picture as the collocated block. Through the determination, accuracy of a corresponding block (or temporal motion vector) may be enhanced. As an embodiment, the reference picture may be defined as the collocated picture.

The encoder/decoder may derive the motion vector of the corresponding block specified by the temporal motion vector in units of subblocks in the current coding block. As an embodiment, when there is no motion vector corresponding to a specific subblock (or when not available), the encoder/decoder may configure (or store) the motion vector of the block positioned at the center of the collocated block as a representative motion vector and use the corresponding motion vector as the motion vector for the specific subblock.

In an embodiment, the encoder/decoder may increase the number of merge candidates and apply the increased merge candidates in order to use the ATMVP mode. In addition, to this end, the additional syntax (or syntax element) may not be used. A syntax indicating the maximum number of merge candidates may be transmitted from the encoder to the decoder through a high level syntax. The high level syntax may be, for example, a sequence parameter set (SPS), a picture parameter set (PPS), or a slice header. As an example, the maximum number of merge candidates may be six.

Further, in an embodiment, an ATMVP-ext candidate indicating an extended ATMVP candidate may be added to the candidate list. The ATMVP-ext may be a method for improving the conventional TMVP similarly to the ATMVP and a subblock-unit motion vector may be derived by combining the spatial neighboring block and the temporal neighboring block.

FIG. 23 is a diagram illustrating a method for deriving an extended Advanced Temporal Motion Vector Prediction (ATMVP) candidate according to an embodiment to which the present disclosure is applied.

Referring to FIG. 23, it is assumed that the size of a current block 2301 is 16×16. Further, in FIG. 23, in deriving the subblock-unit motion vector, it is assumed that the size of the subblock is 4×4, but the present disclosure is not limited thereto and the size of the subblock may be defined as a fixed size of 8×8 or more to be described later.

The encoder/decoder may use motion vectors of spatial neighboring blocks at left horizontal and top vertical locations and motion vectors of temporal neighboring blocks at right horizontal and bottom vertical locations in order to the motion vectors of the respective subblocks in the current block 2301.

For example, the encoder/decoder may derive motion vectors of spatial neighboring blocks at locations L-0 and A-0, derive motion vectors of temporal neighboring blocks of subblocks at locations 1 and 4 in the current block 2301, and calculate an average value of four motion vectors, in order to derive a motion vector for a subblock at location 0 in the current block 2301. The encoder/decoder may determine the average value of the four motion vectors as the motion vector of the subblock at location 0 in the current block 2301. As an embodiment, when only some of four blocks are available, the encoder/decoder an average value of motion vectors of the available blocks. Further, as an embodiment, the reference index may be predetermined (reference index 0 or 1, collocated picture).

In an embodiment, similarly to the ATMVP mode, the encoder/decoder may increase the number of merge candidates and apply the increased merge candidates in order to use the extended ATMVP mode. In addition, to this end, the additional syntax (or syntax element) may not be used.

FIGS. 24 and 25 are diagrams illustrating a fetching process of fetching a motion vector of a temporal neighboring block in a reference picture according to an embodiment to which the present disclosure is applied.

Referring to FIG. 24, the encoder/decoder may fetch (or derive or obtain) motion information stored in a corresponding position in the reference picture (or collocated picture) of the memory (170 of FIG. 1 and 250 of FIG. 2 above) (specifically, the DPB of the memory) in order to derive the motion vector (hereinafter, may be referred to as the temporal motion vector) of the temporal neighboring block of the current block.

In the present disclosure, for convenience of description, a case where the memory is the DRAM is primarily described, but the present disclosure is not limited thereto and the memory may include various storage media including DRAM, USB, SD, CD, DVD, Blu-ray, HDD, SSD, and the like.

As the embodiment, the corresponding position in the reference picture (or collocated picture) may be a right-bottom block of the current block or a center position (i.e., TMVP) of the current block and may be a position (i.e., ATMVP) specified by the motion vector of the spatial neighboring block of the current block.

Referring to FIG. 25, it is assumed that a temporal motion vector is fetched from the DRAM 2501 in units of the current block. In this case, as illustrated in FIG. 25, the encoder/decoder fetches one motion vector stored in a corresponding position block 2502 of the current block in the DRAM 2501 as the temporal motion vector.

Meanwhile, when the ATMVP (i.e., a subblock-based temporal merge candidate) or the extended ATMVP according to the embodiment of the present disclosure is applied, since the motion information is fetched in units of the subblock, one motion information may not be fetched in units of the current block as illustrated in FIG. 25. In other words, when the ATMVP or the extended ATMVP is applied, more data should be fetched to the DRAM 2501. The fetching will be described with reference to following drawings.

FIG. 26 is a diagram illustrating a fetching process of fetching a motion vector of a temporal neighboring block in units of subblocks according to an embodiment to which the present disclosure is applied.

Referring to FIG. 26, it is assumed that the current block is split into four subblocks and motion compensation is performed. Further, as described above, in the present disclosure, for convenience of description, a case where the memory is the DRAM 2601 is primarily described, but the present disclosure is not limited thereto and the memory may include various storage media including the DRAM 2601, USB, SD, CD, DVD, Blu-ray, HDD, SSD, and the like.

When the motion information is fetched in units of four subblocks as illustrated in FIG. 26, the encoder/decoder fetches four motion information corresponding to respective subblocks in the corresponding position block of the current block in the reference picture (or collocated picture) stored in the DRAM 2601. In other words, when the motion information is fetched in units of four subblocks, the encoder/decoder should fetch approximately 4 times data from the DRAM 2601 compared with the case described in FIG. 25 above.

When FIGS. 25 and 26 are compared with each other, it can be seen that the size of the subblock exerts a decisive influence on the amount of data fetched from the DRAM 2601. Accordingly, the size of the subblock may exert a large influence on a pipeline configuration and throughput of the decoder and the encoder according to hardware fetch performance.

In a subblock-based motion compensation method such as an affine motion prediction, the motion vector is derived in units of the subblock based on a derived control point motion vector, but in the case of the ATMVP, i.e., the subblock-based temporal merge candidate (or predictor), since the motion vector stored in the memory is obtained in units of the subblock in the corresponding block of the reference picture (or collocated picture), the affine motion prediction and the ATMVP has a great difference in hardware burden depending on the size of the subblock in spite of similar subblock-based motion compensation.

If the current block is excessively split into a plurality of subblocks, a problem that the fetch should be performed multiple times depending on the size of a memory bus performing the fetch.

Accordingly, the present disclosure proposes a method for setting (or determining or defining) a fixed minimum size of the subblock in order to solve the problem and performing the fetch process for the temporal motion information in units of the set subblock.

In the conventional ATMVP or ATMVP-exit, the current block is split in units of the subblock having the 4×4 size to perform fetch and motion compensation. In this case, a memory which needs to be fetched according to the size of the current block may be excessively large as described above. The hardware burden may be very large and compression performance may deteriorate.

Accordingly, the embodiment of the present disclosure proposes a method for splitting the current block into subblocks having the fixed 8×8 size or subblocks having the fixed 16×16 size. In the method proposed by the embodiment, it is proved that the loss of the compression performance is smaller than hardware complexity enhancement through an experimental result and the experimental result is shown in Tables 2 to 5 below.

First, Table 2 below shows compression performance of performing the ATMVP in units of the 4×4 subblocks.

TABLE 2

| | Over VTM-1.0 | | | | |
|---|---|---|---|---|---|
| | Y | U | V | EncT | DecT |
| Class A1 | −0.80% | −0.77% | −0.66% | 105% | 122% |
| Class A2 | −1.07% | −0.80% | −0.85% | 107% | 129% |
| Class B | −1.02% | −0.77% | −0.66% | 106% | 123% |
| Class C | −1.41% | −1.07% | −1.18% | 105% | 127% |
| Class E | | | | | |
| Overall | −1.09% | −0.86% | −0.84% | 106% | 125% |
| Class D | −1.58% | −0.94% | −1.03% | 106% | 128% |

Table 3 below shows compression performance of performing the ATMVP in units of 8×8 subblocks.

TABLE 3

| | Over VTM-1.0 | | | | |
|---|---|---|---|---|---|
| | Y | U | V | EncT | DecT |
| Class A1 | −0.82% | −0.76% | −0.67% | 104% | 108% |
| Class A2 | −1.02% | −0.75% | −0.83% | 103% | 110% |
| Class B | −0.96% | −0.71% | −0.68% | 103% | 109% |
| Class C | −1.27% | −0.94% | −1.03% | 102% | 111% |
| Class E | | | | | |
| Overall | −1.02% | −0.79% | −0.80% | 103% | 109% |
| Class D | −1.41% | −0.69% | −0.87% | 102% | 110% |

Table 4 below shows compression performance of performing the ATMVP in units of 16×16 subblocks.

TABLE 4

| | Over VTM-1.0 | | | | |
|---|---|---|---|---|---|
| | Y | U | V | EncT | DecT |
| Class A1 | −0.77% | −0.75% | −0.60% | 104% | 115% |
| Class A2 | −0.93% | −0.63% | −0.71% | 105% | 105% |
| Class B | −0.89% | −0.63% | −0.54% | 102% | 106% |
| Class C | −1.15% | −0.70% | −0.85% | 102% | 107% |
| Class E | | | | | |
| Overall | −0.94% | −0.68% | −0.67% | 103% | 108% |
| Class D | −1.26% | −0.55% | −0.60% | 103% | 106% |

Table 5 below shows compression performance of performing the ATMVP in units of 32×32 subblocks.

TABLE 5

| | Over VTM-1.0 | | | | |
|---|---|---|---|---|---|
| | Y | U | V | EncT | DecT |
| Class A1 | −0.72% | −0.64% | −0.52% | 106% | 117% |
| Class A2 | −0.79% | −0.57% | −0.62% | 104% | 123% |
| Class B | −0.81% | −0.50% | −0 49% | 103% | 104% |
| Class C | −1.06% | −0.63% | −0.75% | 103% | 107% |
| Class E | | | | | |
| Overall | −0.86% | −0.58% | −0.59% | 104% | 111% |
| Class D | −1.18% | −0.43% | −0.51% | 104% | 106% |

Referring to the experimental results of Tables 2 to 5 above, it may be confirmed that a difference between compression efficiency and a decoding speed has a trade-off result according to the size of the subblock, but the loss of the compression performance is smaller than the hardware complexity improvement.

In the embodiment of the present disclosure, the encoder/decoder may perform subblock-based motion compensation (i.e., ATMVP or ATMVP-ext) in units of larger than 4×4, i.e., in units of 8×8, 16×16, or 32×32 and fetch the subblock-based temporal motion information in units of the subblock having the corresponding size.

According to the embodiment of the present disclosure, a hardware complexity improvement effect may be obtained, which is higher than a relatively small compression loss in performing the subblock-based motion compensation.

Hereinafter, proposed is a method for limiting the application of the subblock-based temporal motion information deriving method (i.e., ATMVP or ATMVP-ext) proposed by the present disclosure in order to enhance the hardware complexity.

In the embodiment of the present disclosure, the encoder/decoder may not perform the subblock-based temporal motion information deriving method (i.e., ATMVP or ATMVP-ext) if the width or height of the current block (or current coding block) is smaller than a pre-defined size.

In the method described in FIGS. 24 to 26 above, the hardware complexity is improved by reducing a data fetch amount of the motion information in units of the same area, while the embodiment, a worst case complexity may be additionally improved. The conventional vide compression technique performs prediction and transform and other coding by splitting the picture or block into various forms.

As a result, the size of the coding block (coding unit or prediction unit) may be split into blocks having a small size such as 4×4, 4×8, or 8×4. In this case, there may be a case where the size of the current block is smaller than a minimum subblock size of fetching the temporal motion information (or temporal motion vector). In this case, the fetch may be performed with a minimum coding block size rather than the minimum subblock size in terms of hardware.

Accordingly, in the present disclosure, in order to improve such a problem, if the size of the current processing block (or the width and/or height of the current block) is smaller than a pre-defined minimum size, a subblock based temporal motion vector candidate may not be used. In other words, in the embodiment of the present disclosure, the encoder/decoder may add the subblock based temporal motion vector candidate to the candidate list only if the size of the current processing block (or the width and/or height of the current block) is equal to or larger than the pre-defined minimum size. As an embodiment, Equation 3 below may be used as a condition for using the subblock based temporal motion vector candidate.

Condition=Width$_{block}$<MIN_SUB_BLOCK_SI∥Height$_{block}$<MIN_SUB_BLOCK_SIZE  [Equation 3]

FIG. 27 is a flowchart illustrating a method for generating a candidate list according to an embodiment to which the present disclosure is applied.

Referring to FIG. 27, the decoder is mainly described for convenience of description, but the candidate list generating method of the embodiment may be equally performed even in the encoder. In an embodiment, the methods described in FIGS. 12 to 17 and FIGS. 21 to 26 may be applied and duplicated descriptions thereof will be omitted.

A candidate configuration order illustrated in FIG. 27 is one example and the present disclosure is not limited thereto and the order may be changed or some steps may be omitted or added. Further, candidates added in FIG. 27 are examples and various other candidates may be added and some candidates among the candidates illustrated in FIG. 27 may not be used.

The decoder adds a spatial neighboring block (or spatial candidate) to a candidate list (S2701). For example, the decoder may add to the candidate list the neighboring candidate blocks of FIG. 16 described above.

The decoder checks whether the width and the height of the current block is equal to or larger than the pre-defined minimum size (S2702).

The decoder adds a temporal neighboring block (or temporal candidate) to the candidate list if the width and the height of the current block are equal to or larger than the pre-defined minimum size (S2703). The decoder may not add the temporal neighboring block (or temporal candidate) to the candidate list if the width and the height of the current block are smaller than the pre-defined minimum size.

The decoder adds combined motion information (or combined motion vector) to the candidate list and adds a zero motion vector to the candidate list (S2704 and S2705).

The embodiments of the present disclosure descried above have been described separately for the convenience of description, but the present disclosure is not limited thereto. That is, the embodiments described above may be performed independently and one or more various embodiments may be combined and performed.

FIG. 28 is a flowchart showing a method for generating an inter prediction block according to an embodiment to which the present disclosure is applied.

Referring to FIG. 28, the decoder is mainly described for convenience of description, but the present disclosure is not limited thereto and the method for generating an inter-prediction block based on the inter prediction may be substantially equally applied to the encoder.

If a merge mode is applied to a current block, the decoder generates a merge candidate list by using a spatial neighboring block and a temporal neighboring block of the current block (S2801).

The decoder obtains a merge index indicating a candidate for an inter prediction of the current block in the merge candidate list (S2802).

The decoder derives motion vectors a plurality of respective subblocks included in the current block based on the motion vector of the candidate used for the inter prediction of the current block (S2803).

The decoder generates a prediction sample of the current block by using the motion vectors of the respective subblocks (S2804).

As the embodiment, the size of the subblock may be set to a fixed specific size equal to or larger than 8×8.

As the embodiment, the generating of the merge candidate list may include adding a temporal neighboring block of the current block specified by the motion vector of the spatial neighboring block in a collocated picture of the current block to the merge candidate list.

As the embodiment, the generating of the merge candidate list may include adding to the merge candidate list the temporal neighboring block of the current block specified by the motion vector of a first spatial neighboring block in a pre-defined order among the spatial neighboring blocks of the current block in the collocated picture of the current block.

As the embodiment, the generating of the merge candidate list may include identifying whether a width and a height of the current block is smaller than a pre-defined minimum size; and if the width and the height of the current block is greater than or equal to the pre-defined minimum size as a result of the identification, adding a temporal neighboring block of the current block specified by a motion vector of the spatial neighboring block in the collocated picture of the current block to the merge candidate list.

As the embodiment, the pre-defined minimum size may be set to the size of the subblock.

FIG. 29 is a diagram illustrating an inter prediction device according to an embodiment to which the present disclosure is applied.

In FIG. 29, the inter-prediction unit is illustrated as one block for convenience of description, but the inter-prediction unit may be implemented in a component included in the encoder and/or the decoder.

Referring to FIG. 29, the inter-prediction unit implements the functions, procedures, and/or methods proposed in FIGS. 8 to 28 above. Specifically, the inter-prediction unit may be configured to include a merge candidate list generation unit 2901, a merge index obtaining unit 2902, a subblock motion vector derivation unit, and a prediction block generation unit 2904.

If a merge mode is applied to a current block, the merge candidate list generation unit 2901 generates a merge candidate list by using a spatial neighboring block and a temporal neighboring block of the current block.

The merge index obtaining unit 2902 obtains a merge index indicating a candidate to be used for an inter prediction of the current block in the merge candidate list.

The subblock motion vector derivation unit 2903 derives a motion vector of each of subblocks included in the current block based on a motion vector of the candidate used for the inter prediction of the current block.

The prediction block generation unit 2904 generates a prediction sample of the current block by using the motion vector of each of subblocks.

As the embodiment, the size of the subblock may be set to a fixed specific size equal to or larger than 8×8.

As the embodiment, the merge candidate list generation unit 2901 may add a temporal neighboring block of the current block specified by a motion vector of a spatial neighboring block in a collocated picture of the current block to the merge candidate list.

As the embodiment, the merge candidate list generation unit 2901 adds a temporal neighboring block of the current block specified by a motion vector of a first spatial neighboring block according to a pre-defined order in a collocated picture of the current block to the merge candidate list.

As the embodiment, the merge candidate list generation unit 2901 may identify whether a width and a height of the current block is smaller than a pre-defined minimum size, and if the width and the height of the current block is greater than or equal to the pre-defined minimum size as a result of the identification, add a temporal neighboring block of the current block specified by a motion vector of the spatial neighboring block in the collocated picture of the current block to the merge candidate list.

As the embodiment, the pre-defined minimum size may be set to the size of the subblock.

FIG. 30 illustrates a video coding system to which the present disclosure is applied.

The video coding system may include a source device and a receiving device. The source device may transfer encoded video/image information or data to the receiving device through a digital storage medium or network in a file or streaming form.

The source device may include a video source, an encoding apparatus, and a transmitter. The receiving device may include a receiver, a decoding apparatus, and a renderer. The encoding apparatus may be called a video/image encoding apparatus and the decoding apparatus may be called a video/image decoding apparatus. The transmitter may be included in the encoding apparatus. The receiver may be included in the decoding apparatus. The renderer may include a display and the display may be configured as a separate device or an external component.

A video source may acquire a video/image through a capturing, synthesizing, or generating process of the video/image. The video source may include a video/image capture device and/or a video/image generation device. The video/image capture device may include, for example, one or more cameras, video/image archives including previously captured video/images, and the like. The video/image generation device may include, for example, a computer, a tablet, and a smart phone and may (electronically) generate the video/image. For example, a virtual video/image may be generated by the computer, etc., and in this case, the video/image capturing process may be replaced by a process of generating related data.

The encoding apparatus may encode an input video/image. The encoding apparatus may perform a series of procedures including prediction, transform, quantization, and the like for compression and coding efficiency. The encoded data (encoded video/image information) may be output in the bitstream form.

The transmitter may transfer the encoded video/image information or data output in the bitstream to the receiver of the receiving device through the digital storage medium or network in the file or streaming form. The digital storage medium may include various storage media such as USB, SD, CD, DVD, Blu-ray, HDD, SSD, and the like. The transmitter may include an element for generating a media file through a predetermined file format and may include an element for transmission through a broadcast/communication network. The receiver may extract the bitstream and transfer the extracted bitstream to the decoding apparatus.

The decoding apparatus performs a series of procedures including dequantization, inverse transform, prediction, etc., corresponding to an operation of the encoding apparatus to decode the video/image.

The renderer may render the decoded video/image. The rendered video/image may be displayed by the display.

FIG. 31 is a structural diagram of a content streaming system as an embodiment to which the present disclosure is applied.

Referring to FIG. 31, the content streaming system to which the present disclosure is applied may largely include an encoding server, a streaming server, a web server, a media storage, a user device, and a multimedia input device.

The encoding server compresses contents input from multimedia input devices including a smartphone, a camera, a camcorder, etc., into digital data to serve to generate the bitstream and transmit the bitstream to the streaming server. As another example, when the multimedia input devices including the smartphone, the camera, the camcorder, etc., directly generate the bitstream, the encoding server may be omitted.

The bitstream may be generated by the encoding method or the bitstream generating method to which the present disclosure is applied and the streaming server may temporarily store the bitstream in the process of transmitting or receiving the bitstream.

The streaming server transmits multimedia data to the user device based on a user request through a web server, and the web server serves as an intermediary for informing a user of what service there is. When the user requests a desired service to the web server, the web server transfers the requested service to the streaming server and the streaming server transmits the multimedia data to the user. In this case, the content streaming system may include a separate control server and in this case, the control server serves to control a command/response between respective devices in the content streaming system.

The streaming server may receive contents from the media storage and/or the encoding server. For example, when the streaming server receives the contents from the encoding server, the streaming server may receive the contents in real time. In this case, the streaming server may store the bitstream for a predetermined time in order to provide a smooth streaming service.

Examples of the user device may include a cellular phone, a smart phone, a laptop computer, a digital broadcasting terminal, a personal digital assistants (PDA), a portable multimedia player (PMP), a navigation, a slate PC, a tablet PC, an ultrabook, a wearable device such as a smartwatch, a smart glass, or a head mounted display (HMD), etc., and the like.

Each server in the content streaming system may be operated as a distributed server and in this case, data received by each server may be distributed and processed.

As described above, the embodiments described in the present disclosure may be implemented and performed on a processor, a microprocessor, a controller, or a chip. For example, functional units illustrated in each drawing may be implemented and performed on a computer, the processor, the microprocessor, the controller, or the chip.

In addition, the decoder and the encoder to which the present disclosure may be included in a multimedia broadcasting transmitting and receiving device, a mobile communication terminal, a home cinema video device, a digital cinema video device, a surveillance camera, a video chat device, a real time communication device such as video communication, a mobile streaming device, storage media, a camcorder, a video on demand (VoD) service providing device, an (Over the top) OTT video device, an Internet streaming service providing devices, a 3 dimensional (3D) video device, a video telephone video device, a transportation means terminal (e.g., a vehicle terminal, an airplane terminal, a ship terminal, etc.), and a medical video device, etc., and may be used to process a video signal or a data signal. For example, the Over the top (OTT) video device may include a game console, a Blu-ray player, an Internet access TV, a home theater system, a smartphone, a tablet PC, a digital video recorder (DVR), and the like.

In addition, a processing method to which the present disclosure is applied may be produced in the form of a program executed by the computer, and may be stored in a computer-readable recording medium. Multimedia data having a data structure according to the present disclosure may also be stored in the computer-readable recording medium. The computer-readable recording medium includes all types of storage devices and distribution storage devices storing computer-readable data. The computer-readable recording medium may include, for example, a Blu-ray disc (BD), a universal serial bus (USB), a ROM, a PROM, an EPROM, an EEPROM, a RAM, a CD-ROM, a magnetic tape, a floppy disk, and an optical data storage device. Further, the computer-readable recording medium includes media implemented in the form of a carrier wave (e.g., transmission over the Internet). Further, the bitstream generated by the encoding method may be stored in the computer-readable recording medium or transmitted through a wired/wireless communication network.

In addition, the embodiment of the present disclosure may be implemented as a computer program product by a program code, which may be performed on the computer by the embodiment of the present disclosure. The program code may be stored on a computer-readable carrier.

In the embodiments described above, the components and the features of the present disclosure are combined in a predetermined form. Each component or feature should be considered as an option unless otherwise expressly stated. Each component or feature may be implemented not to be associated with other components or features. Further, the embodiment of the present disclosure may be configured by associating some components and/or features. The order of the operations described in the embodiments of the present disclosure may be changed. Some components or features of any embodiment may be included in another embodiment or replaced with the component and the feature corresponding to another embodiment. It is apparent that the claims that are not expressly cited in the claims are combined to form an embodiment or be included in a new claim by an amendment after the application.

The embodiments of the present disclosure may be implemented by hardware, firmware, software, or combinations thereof. In the case of implementation by hardware, according to hardware implementation, the exemplary embodiment described herein may be implemented by using one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

In the case of implementation by firmware or software, the embodiment of the present disclosure may be implemented in the form of a module, a procedure, a function, and the like to perform the functions or operations described above. A software code may be stored in the memory and executed by the processor. The memory may be positioned inside or outside the processor and may transmit and receive data to/from the processor by already various means.

It is apparent to those skilled in the art that the present disclosure may be embodied in other specific forms without departing from essential characteristics of the present disclosure. Accordingly, the aforementioned detailed description should not be construed as restrictive in all terms and should be exemplarily considered. The scope of the present disclosure should be determined by rational construing of the appended claims and all modifications within an equivalent scope of the present disclosure are included in the scope of the present disclosure.

INDUSTRIAL APPLICABILITY

Hereinabove, the preferred embodiments of the present disclosure are disclosed for an illustrative purpose and hereinafter, modifications, changes, substitutions, or additions of various other embodiments will be made within the technical spirit and the technical scope of the present disclosure disclosed in the appended claims by those skilled in the art.

The invention claimed is:

1. A method for decoding an image based on an inter prediction mode, comprising:
    based on that a merge mode is applied to a current block, generating, by a processor, a merge candidate list by using a spatial neighboring block and a temporal neighboring block of the current block;
    obtaining, by the processor, a merge index indicating a candidate to be used for an inter prediction of the current block in the merge candidate list;
    deriving, by the processor, a motion vector of each subblocks included in the current block based on a motion vector of the candidate used for the inter prediction of the current block; and
    generating, by the processor, a prediction sample of the current block based on the motion vector of each subblocks,
    wherein the step of generating the merge candidate list comprises:
    identifying whether a width and a height of the current block is less than a pre-defined minimum size; and
    based on that the width and the height of the current block is greater than or equal to the pre-defined minimum size, adding a block which is located in a collocated picture of the current block and specified by a motion vector of the spatial neighboring block to the merge candidate list as the temporal neighboring block.

2. The method of claim 1,
    wherein generating the merge candidate list comprises adding a block in the collocated picture specified by a motion vector of a first spatial neighboring block to the merge candidate list as the temporal neighboring block, the first spatial neighboring block being determined based on a pre-defined order among two or more spatial neighboring blocks of the current block.

3. The method of claim 1,
    wherein a width of the subblock is set to 8 and a height of the subblock is set to 8.

4. The method of claim 3,
    wherein the pre-defined minimum size is set to 8.

5. A method for encoding an image based on an inter prediction mode, comprising:
    based on that a merge mode is applied to a current block, generating, by a processor, a merge candidate list by using a spatial neighboring block and a temporal neighboring block of the current block;
    signaling, by the processor, a merge index indicating a candidate to be used for an inter prediction of the current block in the merge candidate list;
    deriving, by the processor, a motion vector of each subblocks included in the current block based on a motion vector of the candidate used for the inter prediction of the current block; and
    generating, by the processor, a prediction sample of the current block based on the motion vector of each subblocks,
    wherein the step of generating the merge candidate list comprises:
    identifying whether a width and a height of the current block is less than a pre-defined minimum size; and
    based on that the width and the height of the current block is greater than or equal to the pre-defined minimum size, adding a block which is located in a collocated picture of the current block and specified by a motion vector of the spatial neighboring block to the merge candidate list as the temporal neighboring block.

6. The method of claim 5, wherein generating the merge candidate list comprises:
adding a block in the collocated picture specified by a motion vector of a first spatial neighboring block to the merge candidate list as the temporal neighboring block, the first spatial neighboring block being determined based on a pre-defined order among two or more spatial neighboring blocks of the current block.

7. The method of claim 5, wherein a width of the subblock is set to 8 and a height of the subblock is set to 8.

8. The method of claim 7, wherein the pre-defined minimum size is set to 8.

9. A non-transitory decoder-readable medium for storing a bitstream generated by a video encoder, the bitstream comprising:
information used for generating a merge candidate list by using a spatial neighboring block and a temporal neighboring block of a current block based on that a merge mode is applied to the current block;
information related to a merge index indicating a candidate to be used for an inter prediction of the current block in the merge candidate list;
information used for deriving a motion vector of each subblocks included in the current block based on a motion vector of the candidate used for the inter prediction of the current block; and
information used for generating a prediction sample of the current block based on the motion vector of each subblocks,
wherein the information used for generating the merge candidate list comprises:
information used for adding a block which is located in a collocated picture of the current block and specified by a motion vector of the spatial neighboring block to the merge candidate list as the temporal neighboring block, based on that it is identified that a width and a height of the current block is greater than or equal to a pre-defined minimum size.

* * * * *